(12) United States Patent
Wicks et al.

(10) Patent No.: US 11,037,098 B2
(45) Date of Patent: Jun. 15, 2021

(54) CUSTOMIZED ITEM DISPOSITION SYSTEM

(71) Applicant: Walmart Apollo, LLC, Bentonville, AR (US)

(72) Inventors: Tim Wicks, Bella Vista, AR (US); John Sokolsky, Rogers, AR (US); Joshua Chaney, Gentry, AR (US); Michael Carey, Centerville, VA (US); Russell Dylan Lane, Rogers, AR (US); Rajiv Jivan, McLean, VA (US); Roger Paredes, Bentonville, AR (US); Chelsea Burns, Rogers, AR (US); John E. Petrovich, Bentonville, AR (US); Jennifer Hedges, Lowell, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 126 days.

(21) Appl. No.: 16/354,141

(22) Filed: Mar. 14, 2019

(65) Prior Publication Data
US 2019/0287055 A1 Sep. 19, 2019

Related U.S. Application Data

(60) Provisional application No. 62/643,607, filed on Mar. 15, 2018.

(51) Int. Cl.
*G06Q 30/00* (2012.01)
*G06Q 30/06* (2012.01)
(Continued)

(52) U.S. Cl.
CPC ....... *G06Q 10/087* (2013.01); *G06Q 30/0283* (2013.01)

(58) Field of Classification Search
CPC .......... G06Q 10/087; G06Q 30/0283
See application file for complete search history.

(56) References Cited

U.S. PATENT DOCUMENTS

| 6,536,659 B1 * | 3/2003 | Hauser | G06Q 30/06 235/375 |
| 6,754,637 B1 | 6/2004 | Stenz | |

(Continued)

OTHER PUBLICATIONS

Unknown, "Reverse Logistics: Backwards Practices that Matter", Genco Distribution System, Inc., Case Study, Jan. 12, 2007, Pittsburgh, Pennsylvania, 18 pages.
(Continued)

*Primary Examiner* — Talia F Crawley

(57) ABSTRACT

Examples provide a system for managing disposition of returned items and/or items having damaged packaging. An item is identified based on item scan data. Item data associated with the item and condition data describing the condition of the item, including describing defects in the item or item packaging. The system identifies a set of applicable disposition options customized for the item. The system recommends a disposition from the set of applicable disposition options to assist the user with selection of an appropriate disposition. The disposition can include a price markdown, donation of the item, return of the item to a supplier, and so forth. If the selected option is a markdown of the item, the item disposition component generates a markdown amount for the selected item which avoids loss for the item. The item disposition system generates a label for the item including details of the selected disposition.

20 Claims, 13 Drawing Sheets

(51) Int. Cl.
*G06Q 10/08* (2012.01)
*G06Q 30/02* (2012.01)

(56) References Cited

U.S. PATENT DOCUMENTS

| | | | | |
|---|---|---|---|---|
| 7,376,572 | B2* | 5/2008 | Siegel | G06Q 10/0833 705/1.1 |
| RE42,177 | E* | 3/2011 | Hauser | G06Q 30/06 235/375 |
| 8,108,269 | B2* | 1/2012 | Wechsel | G06Q 30/00 705/28 |
| 8,407,110 | B1 | 3/2013 | Joseph et al. | |
| 8,639,558 | B2* | 1/2014 | Desai | G06Q 30/02 705/7.29 |
| 9,652,732 | B1* | 5/2017 | Barstad | G06Q 30/06 |
| 9,984,351 | B1 | 5/2018 | Antony et al. | |
| 10,318,921 | B1* | 6/2019 | Tilly | G06Q 20/208 |
| 2001/0047308 | A1* | 11/2001 | Kaminsky | G06Q 30/0601 705/26.8 |
| 2004/0193438 | A1* | 9/2004 | Stashluk, Jr. | G06Q 30/016 705/304 |
| 2005/0137901 | A1* | 6/2005 | Siegel | G06Q 20/10 705/39 |
| 2005/0216368 | A1* | 9/2005 | Wechsel | G06Q 30/00 705/28 |
| 2007/0156439 | A1* | 7/2007 | Fyda | G06Q 10/20 705/308 |
| 2008/0077459 | A1* | 3/2008 | Desai | G06Q 10/06314 705/7.24 |
| 2014/0172726 | A1 | 6/2014 | Junger et al. | |
| 2015/0170111 | A1 | 6/2015 | Evenson et al. | |
| 2015/0317659 | A1* | 11/2015 | Nayak | G06Q 30/0206 705/7.35 |
| 2015/0339690 | A1* | 11/2015 | Stevens | G06Q 10/06311 705/7.13 |
| 2017/0200180 | A1* | 7/2017 | Kannan | G06Q 10/087 |
| 2018/0225623 | A1* | 8/2018 | Mosier | G06Q 10/087 |
| 2019/0026686 | A1 | 1/2019 | Ryals et al. | |

OTHER PUBLICATIONS

Mui, Ylan Q., "New Life for Unwanted Gifts: Its' High Season for Firms That Resell Returned Items", Via Trading Corporation, https://www.viatrading.com/about/media-and-press/new-life-unwanted-gifts-high-season-firms-resell-returned-items/, captured Mar. 26, 2018, 94 pages.
Copenheaver, Blaine R., "International Search Report", International Application No. PCT/US2019/022373, dated Jun. 10, 2019, 2 pages.
Copenheaver, Blaine R., "Written Opinion", International Application No. PCT/US2019/022373, dated Jun. 10, 2019, 4 pages.

* cited by examiner

FIG. 14
Item Details 1402
| | | | |
|---|---|---|---|
| Item A  | UPC<br>Price<br>Cost | 1404<br>787425839<br>$1.18<br>$0.77 | 1<br>EA |
| Item B  | UPC<br>Price<br>Cost | 1406<br>12345678<br>$1.38<br>$0.96 | 1<br>EA |
| Item C  1408 | UPC<br>Price<br>Cost | 24891001<br>$3.64<br>$12.20 | 1<br>EA |

US 11,037,098 B2

CUSTOMIZED ITEM DISPOSITION SYSTEM

BACKGROUND

When items in a retail store are returned or found to be damaged, they are typically taken to a claims area where a store personnel pulls each item and decides what to do with it based on the person's own experience before scanning the item. A claims item can be marked down for sale, returned to a supplier, donated to a charity, or subject to disposal if the item is no longer suitable for utilization or consumption due to the condition of the item. However, if a decision is made to markdown the claims item, the associate may inadvertently mark the price down too low, such that the item sells at a loss. Additionally, there are frequently dozens or even hundreds of rules, regulations, and criteria dictating proper disposition of items. The store personnel are expected to stay current on these rules to make correct item disposition decisions. This is frequently a time-consuming, complicated, manual, tedious, and inefficient process. Moreover, users may mistakenly apply older disposition rules that are no longer valid or fail to apply new/modified rules of which the user is unaware. Thus, the user may decide disposition of an item without any reference to all the relevant written rules/guidelines. This can result in inefficient disposition of claims items, subjective and inconsistent application of rules, erroneous disposition decisions, disparate disposition of similar items, and loss associated with markdown items.

SUMMARY

Some examples provide a system for customized disposition of returned items. The system includes a memory and a processor communicatively coupled to the memory. An assessment component analyzes item data associated with a selected item in a set of returned items and condition data describing a condition of the selected item using a set of per-location disposition rules. The assessment component identifies a set of applicable disposition options associated with the selected item. A notification component outputs a rule update reminder associated with performing disposition of the selected item if there is a new rule added to the set of per-location disposition rules within a predetermined time-period or a rule is modified within the predetermined time-period. A recommendation component generates a recommended disposition of the selected item based on the set of applicable disposition options and a result of the analysis. A calculator component calculates a per-item markdown amount for the selected item if the recommended disposition includes markdown of the selected item. An instruction generator generates a set of instructions for performing the recommended disposition of the selected item. The set of instructions includes a location for placement of the selected item and/or the calculated per-item markdown amount. A user interface component outputs the set of instructions to the user in real-time as the user is performing the disposition of the selected item.

Other examples provide a computer-implemented method for managing customized disposition of item. An assessment component identifies a selected item based on analysis of scan data obtained from at least one scan device. A notification component prompts a user to provide condition data describing a condition of the selected item. A set of applicable disposition options associated with the selected item is generated based on an analysis of item data associated with the selected item and the condition data using a set of per-location disposition rules. A user interface component receives a selection of a disposition in the set of applicable disposition options. The notification component outputs a prompt requesting confirmation of the selected disposition on condition the selected disposition is a non-recommended disposition. An instruction generator outputs a set of instructions for performing the recommended disposition of the selected item. The set of instructions includes a location for placement of the selected item and/or the calculated per-item markdown amount. A label generator prints a disposition label, for placement on the selected item. The disposition label includes an identification of the selected disposition.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 14 is an exemplary screenshot 1400 of a user device displaying values associated with a set of claims items.

Corresponding reference characters indicate corresponding parts throughout the drawings.

DETAILED DESCRIPTION

Figure 1:
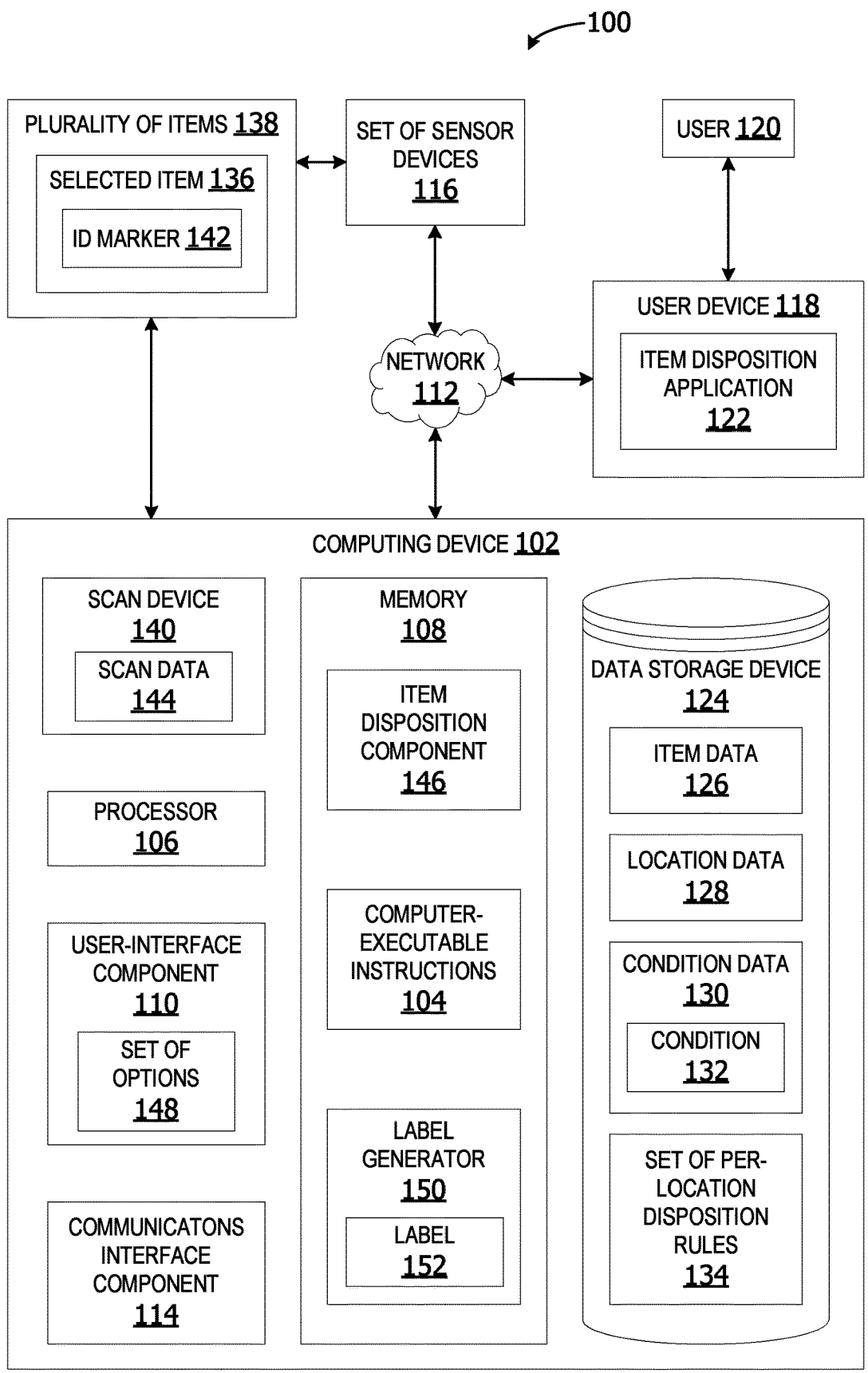
FIG. 1 is an exemplary block diagram illustrating a system for managing disposition of returned items.

Referring to the figures, examples of the disclosure enable customized disposition of returned items. In some examples, an item disposition component analyzes item data and condition data using a set of disposition rules customized for a given store location to identify a recommended disposition of the item from a set of applicable disposition options for the item. This enables the system to automatically identify a most appropriate disposition of an item based on rules applicable to the item without user intervention.

The set of disposition rules, in some examples, is an aggregate of all relevant rules, federal laws, state laws, local laws, regulations, store policies, procedures, disposition criteria, supplier contract terms, hazardous materials handling rules, or other guidelines associated with disposition of items returned to an item selection area. The item selection area is a retail environment or portion of a retail environment, such as a grocery store, pet store, hardware store, or any other type of store or item return location. The item selection area can also include an area, department or portion of a retail environment, such as, but not limited to, a produce department, meat department, dairy department, pet supplies department, automotive department, clothing department, bakery, toy department or any other area of a store.

The system outputs rule change updates to inform users of recent relevant rule changes, such as one or more new disposition rules and/or one or more updated/changed or otherwise modified disposition rules. This notifies the user of any rules which the user may not be aware of due to the recent additions/changes. This improves user efficiency, reduces errors associated with item disposition decisions, and increases consistency regarding application of the applicable rules.

If the selected disposition is to markdown the item, the system identifies an appropriate markdown value for the item based on the item data, original sale price of the item and/or the margin (cost) for the item. The selected disposition is the disposition option from the set of selected disposition options selected by the user. As used herein, the term margin refers to the different between the cost to purchase or manufacture an item and the sale price or value of the item. This enables automatic markdown of an item while preventing items from being marked down or sold with a negative margin (loss) on the item.

Other examples generate a label for an item including details of the selected disposition of the item. The label includes useful information, such as, but not limited to, a location where the item should be placed, a recipient to receive the item, an address where the item should be sent, instructions for recycling the item, instructions for disposal of the item, whether the item is a connected device and/or a markdown price. A connected device is a device capable of connecting to a network, such as an Internet of Things (IoT) device. The smart label information enables more accurate and efficient disposition of items received via returns and/or damaged items.

Referring again to FIG. 1, an exemplary block diagram illustrates a system 100 for managing disposition of returned items. A returned item is an item which has been returned to a store or an item which is defective, subject to recall, non-functional item or an item that has otherwise become damaged. An item can be returned as a claims item due to missing parts, opened packaging, damage to item packaging, damage to the item itself, removal of cold-chain items from a temperature-controlled area, removal of a comestible item from store premises, and/or a defective item. A defective item is not usable for its original intended purpose. A damaged item is an item having some flaw or damage but which can still be used for its original intended purpose.

A returned item can also include an item within a store or other retail environment that has become damaged, such as an item discovered on a display or sales floor having damaged packaging, an item dropped by a customer within the store, or items damaged during stocking, etc. The system in these examples provides for disposition of the damaged items in accordance with a set of rules for handling return of the damaged items to a supplier, markdown, disposal, recycling or donation of such items.

In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 can also include a user interface component 110.

The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 9, FIG. 10, FIG. 11, FIG. 12, and FIG. 13).

The computing device 102 further has one or more computer-readable media, such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. For example, the applications can represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user can input commands or manipulate data by moving the computing device 102 in a particular way.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a set of sensor device 116 and/or a user device 118, can occur using any protocol or mechanism over any wired or wireless connection. In some examples, the communications interface component 114 is operable with short range communication technologies such as by using near-field communication (NFC) tags.

The set of sensor devices 116 includes one or more sensor devices for scanning a returned item, such as, but not limited to, a handheld barcode scanner device, a radio frequency identifier (RFID) tag reader, a matrix barcode reader, a quick response (QR) code reader, a universal product code (UPC) reader, etc. The computing device 102 can receive scan data associated with one or more returned items from the set of sensor devices 116 in the item selection area.

The user device 118 associated with user 120 represents any device executing computer-executable instructions. The user device 118 can be implemented as a mobile computing device, such as, but not limited to, a wearable computing device, a mobile telephone, laptop, tablet, computing pad, netbook, gaming device, and/or any other portable device. The user device 118 includes at least one processor and a memory. The user device 118 can also include a user interface component.

In this example, the user device 118 includes an item disposition application 122 stored on the memory and executed on the at least one processor. The item disposition application 122 can be implemented as a client-side application downloaded from a server or cloud storage for automated claims disposition. In some examples, the item disposition application 122 is downloaded from the computing device 102 via the network 112.

The system 100 optionally includes a data storage device 124 for storing data, such as, but not limited to item data 126 associated with a selected item 136, location data 128, condition data describing a condition 132 of the selected item 136, and/or a set of per-location disposition rules 134. The item data 126 can include an item identifier, a type of the item, cold-chain requirements associated with the item, shelf-life (expiration date) for the item, brand, ingredients, supplier, item cost, etc. The location data 128 includes a location identifier associated with a store or other item selection area associated with the plurality of items 138, including the selected item 136.

The set of per-location disposition rules 134 is a set of rules, laws, regulations, policies, and contractual obligations for handling disposition of items returned to a store. The set of per-location disposition rules 134 in some examples includes supplier agreement terms for returning items (products) back to a supplier. The set of per-location disposition rules 134 can also include rules for restocking items, marking down returned items for sale, donating items to charity, and/or safely disposing of items in accordance with relevant laws, rules, policies and regulations.

The set of per-location disposition rules in other examples specify whether a returned item is on recall, include compliance considerations, criteria regarding item condition, and supplier guidelines regarding what can be done with an item, etc. The user scans a returned item and automatically applies all the rules relevant/applicable to the returned item to identify one or more appropriate item disposition options. In some examples, when the user scans the selected item, the system automatically checks for recalls or restricted sales associated with the item immediately before any other analysis is done.

For example, the set of per-location disposition rules 134 can include rules for the safe handling of perishable items and/or cold-chain compliant items returned to the store. The set of per-location disposition rules 134 can also include rules for handling flammable items, such as lighter fluid, starter logs, paint remover/paint thinner, kerosene, or other flammable liquids. The rules may include special handling, packaging and/or disposal rules/guidelines for electronics, batteries, paint and other items.

The set of per-location disposition rules 134, including compliance instructions, can vary from location-to-location. The set of per-location disposition rules 134 can vary based on the country, state, city, county, region or even vary at the store-level. In other words, the policies or rules for determining disposition of an item can be different in different states, different counties, different cities and/or at different stores. The rules may permit returned item at one store be placed on clearance (restocked) with a markdown price but the rules at another store may specify that the same item in the same condition should be donated to a charity.

The set of per-location disposition rules 134 can also vary based on the time of year or seasonality of the item. For example, if a Halloween decoration item is returned prior to Halloween in un-opened packaging and excellent condition, the rules may specify that the item should be restocked or marked down. However, if the same Halloween decoration item is returned in the same condition in November (after Halloween), the set of per-location disposition rules 134 for that item may specify the item be placed on clearance at a greater markdown price or be returned to the supplier. Thus, the recommended disposition of an item may vary on a per-item, per-supplier, per-location and per-date/season at which the item is returned. In other words, the proper/recommended option for disposing of the item can be different depending on the return location (location of store) at which the item is returned, the date/season in which the item is returned, current condition of the item when returned and/or the current supplier agreement applicable to the item.

The system determines the return location at which the item being scanned based on location data and provides the correct markdown/disposition instructions for that location. In some examples, the item disposition system requires a user sign-in process, which includes a store identifier in the location data. The store identifier informs the system as to which location the computer device/user device located and where the scanned item is located. In other examples, the system determines the location of the item based on the local store network, such as the network 112. The system recognizes the network (Wi-Fi router) and determines the location based on that information.

The condition data 130 includes data describing the condition 132 of the item and/or the item packaging. The condition data 130 can include user-provided condition data describing the condition of the item, a user-provided reason identifying the reason for return of the item and/or condition data obtained from one or more sensor devices.

The user-provided reason is a code or description indicating why an item was returned. The reason can be provided by the customer returning the item or a store employee or other associate processing/handling the item return. A reason code is a code from a predetermined set of codes indicating why an item is being returned. The reason code may indicate the item is returned because it does not work, is the wrong size, a returned gift, an exchange, or any other reason.

The condition data from the sensor device(s) can include any data associated with condition or appearance of an item, such as, but not limited to, one or more images of the item obtained from a camera or other image capture devices.

The condition data 130 can include data describing tears or rips in packaging, leaks, bends, dents in cans, smashed or crushed boxes, temperature of item, marking, missing parts, malfunctioning part, damaged parts, missing items in a set, dirt (cleanliness), stains on cloth, missing packaging, missing tags, stretched cloth, item integrity, broken seals, holes in clothing items, punctures in plastic bags or any other data describing the state or condition of an item.

The per-location disposition rules can specify disposition of the item based on the condition, such as whether the packaging is un-opened or damaged, as well as the degree of any damage. For example, if a rip or tear in a cardboard box is only one inch long or less, the damage can be considered minor and the item suitable for sale at a markdown price. However, if the rip or tear is more than two inches long or the damage renders the label/ingredients unreadable, the damage can be considered too extensive for sale. In such cases, the item disposition component can designate the item suitable for donation if the inner packaging is intact and the item expiration date is not expired.

Likewise, if a package is dented but otherwise un-opened, the item may be suitable for markdown. However, if the package is opened and one or more pieces or components are missing, the item may only be suitable for donation or disposal depending on the type of item.

The set of per-location disposition rules 134 includes rules, regulations, policies, procedures, and/or guidelines for disposing of items which have been returned to a store. These returned items can optionally include defective items and/or damaged items. The set of per-location disposition rules 134 can include, for example but without limitation, a rule specifying that any edible items (comestibles) which have left a store's premises prior to return of the item are only eligible for disposal. For example, if a customer returns a jug of milk that left the building prior to return, the item is disposed of because grocery/comestible items that have left the store are non-eligible for markdown or donation due to cold-chain compliance rules.

In some examples, if a user disposes of an item, the user enters a reason code into item disposition history data and/or inventory data identifying a reason for disposing of the item. For example, if the item packaging is open, the user enters a reason code for opened/unsealed packaging.

Another rule can specify that non-perishable items having slightly damaged outer packaging, but undamaged/intact inner packaging is eligible for markdown pricing or donation to a charity. For example, if a box of soap is found within the store with minor cosmetic damage to the outside of the package, the soap may be eligible for markdown or donation.

The data storage device 124 can include one or more different types of data storage devices, such as, for example, one or more rotating disks drives, one or more solid state drives (SSDs), and/or any other type of data storage device.

The data storage device 124 in some non-limiting examples includes a redundant array of independent disks (RAID) array. In other examples, the data storage device 124 includes a database.

The data storage device 124 in this example is included within the computing device 102 or associated with the computing device 102. In other examples, the data storage device 124 is a remote data storage accessed by the computing device via the network 112, such as a remote data storage device, a data storage in a remote data center, or a cloud storage.

The computing device, in other examples, also includes a scan device 140 for scanning an identifier (ID) marker 142 associated with one or more items in the plurality of items 138. The scan device 140 can be implemented as any type of device for scanning an ID marker, such as, but not limited to, a matrix barcode scanner, an RFID tag reader, a UPC code scan device, a QR code scan device, etc. The ID marker 142 can be implemented as any type of identifying marking or tag on an item, such as, but not limited to, a digimarc, a UPC code, an RFID tag, a printed label (text), a barcode, a matrix barcode, a QR code, etc. The scan device 140 generates scan data 144 associated with the ID marker 142 on the selected item 136.

In some examples, the ID marker includes an item expiration date or sell-by-date embedded within the ID marker. The user can scan the ID marker to determine markdown of item price. In other examples, the ID marker includes a temperature sensor for recording temperature of an item. The temperature data generated by the temperature sensor can be utilized for cold-chain compliance determination.

The memory 108 in some examples stores one or more computer-executable components. Exemplary components include an item disposition component 146. The item disposition component 146 analyzes the scan data 144 and identifies the selected item 136 based on the analysis of the scan data 144. The item disposition component 146 prompts the user 120 to provide the condition data 130 describing a condition of the selected item. In some examples, the item disposition component 146 outputs a prompt to the user device 118 via the network 112. In other examples, the item disposition component 146 outputs the prompt to the user 120 via the user interface component 110 on the computing device 102.

The item disposition component 146 generates a set of options 148 associated with the selected item 136 based on an analysis of item data 126 and the condition data 130 using the set of per-location disposition rules 134. The set of options 148 is a set of one or more disposition options applicable to the selected item 136. The item disposition component 146 can output the set of options 148 to the user 120 via the user interface component 110. The set of options 148 can include, for example, but without limitation, restocking the item, marking the item down, donating the item, recycling the item, returning the item to a supplier, sending the item to a refurbishing location, and/or disposing of the item. A refurbishing location is a location at which an electronic or other IoT (connected) device can have its memory wiped/erased or replaced for resale, donation, etc.

In some examples, a label generator 150 prints a smart tracking label 152 for placement on the selected item 136. The label 152 can be printed on a printer device. The printer device in some examples is network enabled permitting the device to receive documents/labels for printing via a network, such as, a local Wi-Fi.

The label 152 can include an identification of the manner of disposition of the selected item, identify whether the item is a connected device, identify whether the item is a hazardous item, include special handling instructions, as well as any other useful information. In some examples, if the item has damaged packaging, the label can include identification data identifying the name of the item, type, variety, or other information. If the item is a connected device, the label can include an IoT device indicator. In still other examples, the label includes a destination for the item, such as, a donation bin/box, a clearance/markdown bin, a perishable items disposal area, etc.

In a non-limiting example, the label 152 includes an identification of a recipient, such as a charitable entity, receiving or picking up the item. The label can include an address of a recipient or shipping address where the item is going to be sent, such as the address of a supplier of the item if the item is being returned to the supplier. The label, in other examples, includes a location where the item should be placed, such as, but not limited to, a donation box, a recycle bin, a trash compactor, etc. For example, if an item is to be disposed of, the label on the item includes instructions in a statement, such as, but not limited to, "dispose in trash compactor."

In some examples, the smart tracking label 152 is attached to an item via a removable/temporary adhesive or other substance such that the label can be removed without defacing the item. The label can include a bar code that ties the item to all the disposition information about the item. The label can be printed from any printer or other label making/printing device in the store or other item selection area. The label can include the selected method of disposition for the item and necessary information that allows for visual processing of the item.

The system outputs instructions to the user regarding proper location/placement of the smart tracking label on the item. This prevents placement of the label over the item's barcode or other identifier on the item.

The label in some examples prevents markdown items from being returned at other stores for full face value. The label data is stored on a remote storage device or on a cloud storage so that other entities/users can view or obtain the label data. The label can include a description of the damage/defect, if any, associated with the item. The label can be reprinted as necessary.

In these examples, the label is utilized as a guide, identification or instruction providing label to assist users performing tasks associated with disposition of a returned item. In other examples, the label can optionally be utilized for auditing/tracking purposes to monitor returned items within the item selection area prior to completing item disposition.

In other examples, the item disposition application 122 running on the user device 118 analyzes the scan data 144, the item data 126, location data 128 and/or the condition data 130 using the set of per-location disposition rules 134 to generate the set of options 148. The user device 118, in some of these examples, includes a scan device for scanning the ID marker 142 on the selected item 136 or the user device 118 receives the scan data from another scan device, such as the scan device 140 or a scan device in the set of sensor devices 116.

Previously, systems used separate store claims process (SCP), customer value program (CVP) for determining which items are eligible for reduced markdown in store if it meets certain considerations, a donation tracker for identifying items qualifying for donation and tracking donations, and/or a separate markdown interface screen for item markdowns. A user could select any of these processes but may not know which one is proper/applicable for the given item based on characteristics of the item that would indicate which process to use.

In contrast, the item disposition component 146 aggregates these systems/functions together, so the item disposition system is able to all rules of current disparate systems to an identified item and provide instruction to the user indicating action(s) to be taken with regard to each item. The item disposition component 146 identifies the best disposition option for a given item that will satisfy all applicable rules/regulations associated with that item while maximizing value obtained from that item (profit or goodwill), and then provides instructions for how to complete that process.

In some examples, if the returned item is a connected (IoT) device, the item disposition component 146 accesses the set of per-location disposition rules 134 to determine how to handle the connected device in accordance with one or more IoT handling policies. A connected device is a device capable of connecting to a network via a wired or wireless connection, such as, but not limited to, a Wi-Fi connection. A connected device can include any type of item having network connectivity. A connected device can include a smart phone, tablet, toy, smart television, clock, smart kitchen appliances, stereo, watch, smart doorbell, camera, smart cleaning device, robotic cleaning device, unmanned aerial vehicle (UAV) or any other type of device.

An IoT handling policy in some examples specifies that if an IoT device has been opened, the memory on the device is replaced or otherwise wiped/erased prior to disposition of the item. In other words, one or more actions are taken to ensure an absence of previously entered user data on the memory of the IoT device prior to re-shelving/markdown, donation or disposal to protect data of any previous user of the device.

Figure 2:
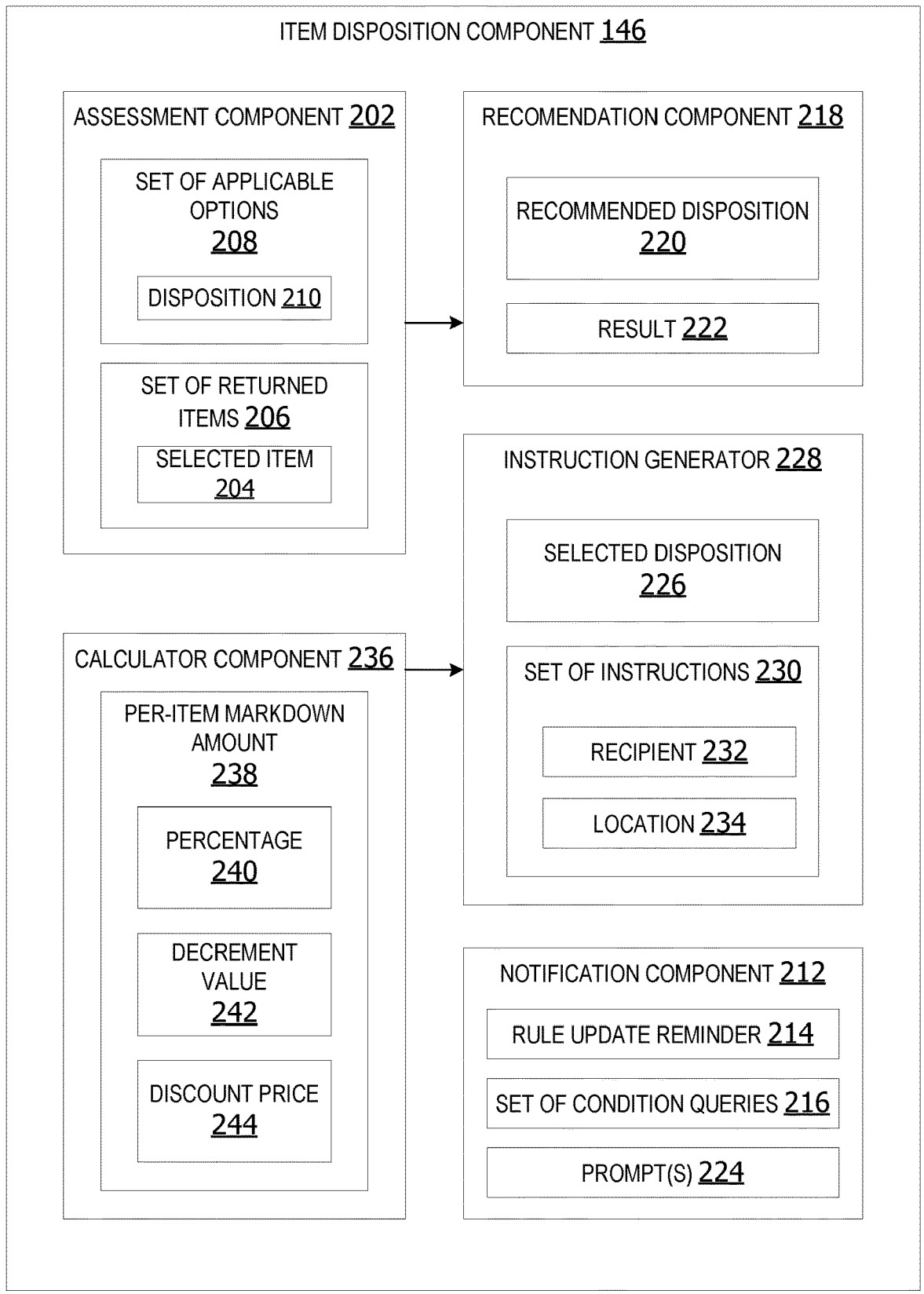
FIG. 2 is an exemplary block diagram illustrating an item disposition component.

FIG. 2 is an exemplary block diagram illustrating an item disposition component 146. An assessment component 202 analyzes item data associated with a selected item 204 in a set of returned items 206 and condition data describing a condition of the selected item 204 using a set of per-location disposition rules to generate a set of applicable options 208 for disposition 210 associated with the selected item 204. The condition data can include data associated with an appearance of the item, an appearance or condition of the item's packaging, appearance or condition of an item's label, whether the item has been opened or unopened, whether the item is functional or defective, the user-provided reason for the item's return, or any other data associated with the condition of the item at the time of return to the store or other return location or return kiosk.

The set of returned items 206 is a set of one or more items damaged or otherwise claimable in an item selection area. A returned item can include an item purchased by a customer and then returned to a store, return kiosk or another brick-and-mortar location. The returned item can be an item purchased by a user (customer) from the item selection area, another store or online (e-commerce) purchase. The returned item can also include an item received as a gift from a third party. A returned item can also include a damaged or otherwise defective item within the item selection area (store) which is no longer suitable to remain in the usual/assigned display area for that type of item. A returned item can be referred to a claimable item, claims item, exchange item, or item return.

A returned item can be in any type of condition. The item can be unopened, opened, damaged, intact, functional, non-functional, missing pieces, used or unused. A returned item can be any type of item, such as, but not limited to, a perishable item, a tool, clothing, shoes, comestible, toy, pet supplies, plant, beverage, decoration, housewares, office supplies, furniture, container, wrapping paper, batteries, automotive parts, sporting goods, craft-related item, or any other type of item which can be returned to a store. A returned item can be a connected (IoT) device or a non-connectable device. A non-connectable device is a device that is incapable of connecting to a network (not an IoT type of device). A connected device can be any type of product capable of connecting to a network, such as, but not limited to, a phone, watch, footwear, tablet, toy, video game, houseware, appliance, thermostat or any other type of item having the ability to connect to a network.

The set of applicable options 208 includes one or more options for disposition of a selected item at a selected location. The selected location is the location in which the returned item is received. The set of applicable options 208 includes options, such as, but not limited to, one or more options in the set of options 148 in FIG. 1. The set of applicable options 208 are generated based on the identification of the item, the condition of the item and application of the set of per-location disposition rules for the item.

The set of applicable options includes options customized or applicable to a given item, a given store and/or a given time-period. In other words, the options in the set of applicable options for a first item can include different options than the set of applicable options for a different second item.

A notification component 212 outputs a rule update reminder 214 to a user associated with performing the disposition of the selected item 204 if a rule is updated, added, or removed from the set of disposition rules within a predetermined time-period. The predetermined time-period is a period of time preceding the disposition assessment. For example, the rule update reminder 214 can include rule update reminders for any rule changes applicable to the selected item 204 which have been made to one or more rules within the last six weeks. In another example, the rule update reminder 214 includes reminders associated with rule changes made within the previous three months. In still another example, the rule update reminder 214 includes reminders associated with rule changes made within the previous forty-eight hours. In other examples, the rule update reminder is sent when a rule change is made in real-time.

The notification component 212 can also output a set of condition queries 216 prompting the user to provide condition data associated with the selected item 204. For example, the set of condition queries 216 can include a query regarding a condition of an outer packaging of the item, a query regarding the inner packaging of an item, a query regarding a length or size of a tear or dent on a package, a query regarding a location of a dent on a can, functionality of a device, etc.

A recommendation component 218 generates a recommended disposition 220 of the selected item 204 based on the set of applicable options 208 and a result 222 of the analysis of the item data, condition data, and/or location data of the item using the set of disposition rules. In some examples, the recommendation component 218 only outputs a recommended disposition 220 if the user fails to select an option from the set of applicable options 208. In other examples, the recommendation component 218 outputs the recommended disposition 220 with the set of applicable options 208. The recommended disposition 220 is the option with the highest disposition value path for the selected item being considered. A value path refers to the outcome (disposition) likely to provide the greatest value or least loss with regard to a selected (returned) item.

If the user selects a non-recommended disposition option from the set of applicable options 208, the notification component 212 outputs one or more prompt(s) 224 to confirm the user's selection of the non-recommended disposition 220. A non-recommended disposition option is an option in the set of options which has not been recommended as having the highest value path or least loss likely for the item. For example, if the recommended disposition is markdown by thirty percent (30%) but the user selects to dispose of the item, the user has selected a non-recommended option. In these situations, the system can output a notification to the user and/or send a notification to another user, such as a manager or supervisor regarding disposition of the item contrary to the system recommendation. The notification can be sent to a user device associated with the user.

In some examples, a first prompt is output with the recommended disposition 220. The user can indicate a selected disposition which is the same as the recommended disposition or different than the recommended disposition.

If the selected disposition 226 is a disposition option other than the recommended disposition 220, the notification component 212 outputs a prompt requesting confirmation of the selected disposition 226. The prompt is output on a user interface, such as, but not limited to, the user interface component 110 in FIG. 1. If confirmation is received, the instruction generator 228 generates a set of instructions regarding completion of the disposition of the selected item 204 in accordance with the selected disposition 226 method.

In other examples, if confirmation is received, the system sends a notification to a second user, such as the manager/supervisor indicating deviation from the recommended disposition. The system can optionally require the second user to verify/confirm the alternative (non-recommended) disposition. In other words, the system can simply output a passive notification of the non-recommended disposition selection by the first user or require approval/confirmation of the selection from the second user before proceeding to print the label and/or generate the set of instructions associated with the selected disposition.

The set of instructions 230 includes directions or instructions for repairing, marking down the item, donating the item, returning the item to a supplier, recycling the item, or disposal (throw-away/trash) of the selected item. Repairing refers to repairing packaging, replacing packaging or otherwise correcting a minor issue associated with the item. An item can be repaired where the damage to the outer package is minor and there is no damage to inner package. For example, if an outer box of a toy package is open but the inner packaging (bag) is sealed and its contents are otherwise undamaged, a user can tape or glue the box closed to repair the box and return the item to its designated display area or clearance/markdown area.

The set of instructions 230 can include a recipient 232, such as an individual or charitable entity to receive the selected item 204. The set of instructions 230 can include a location 234 where the selected item 204 should be placed, such as in a donation box, a recycling container, a trash compactor, a clearance bin, or other location.

The set of instructions 230 can be output in an audio/audible format, a visual (video) format, or an audio and video format. The set of instructions 230 in some examples includes pictorial representations (illustrations) associated with one or more actions to be performed by the user performing the disposition of the item (markdown, donation, etc.).

In other examples, the instructions can be output via an augmented reality device associated with the user. The augmented reality device can provide/output the instructions via text, visual illustrations or graphical images superimposed over real-world images. For example, an augmented reality device can highlight or provide arrows pointing to a correct box, bin or appropriate location for placement/storage of a returned item.

A calculator component 236 calculates a per-item markdown amount 238 for the selected item 204 if the recommended disposition and/or selected disposition includes markdown of the selected (returned) item. The per-item markdown amount 238 can include a percentage 240 markdown amount, such as, but not limited to, a ten-percent markdown, a twenty-five percent markdown, a fifty percent markdown, a seventy-five percent markdown, a ninety percent markdown, or any other percentage markdown amount.

The per-item markdown amount 238 can include a price decrement value 242. A decrement value 242 can include a dollar amount or other increment value by which an original price is reduced. The original price is the retail price or other price of the item prior to the current markdown.

The per-item markdown amount 238 in other examples includes a final discount price 244. For example, if the original price is ten dollars and the per-item markdown amount 238 is a twenty-five percent markdown, the final discount price 244 is seven dollars and fifty cents.

Figure 3:
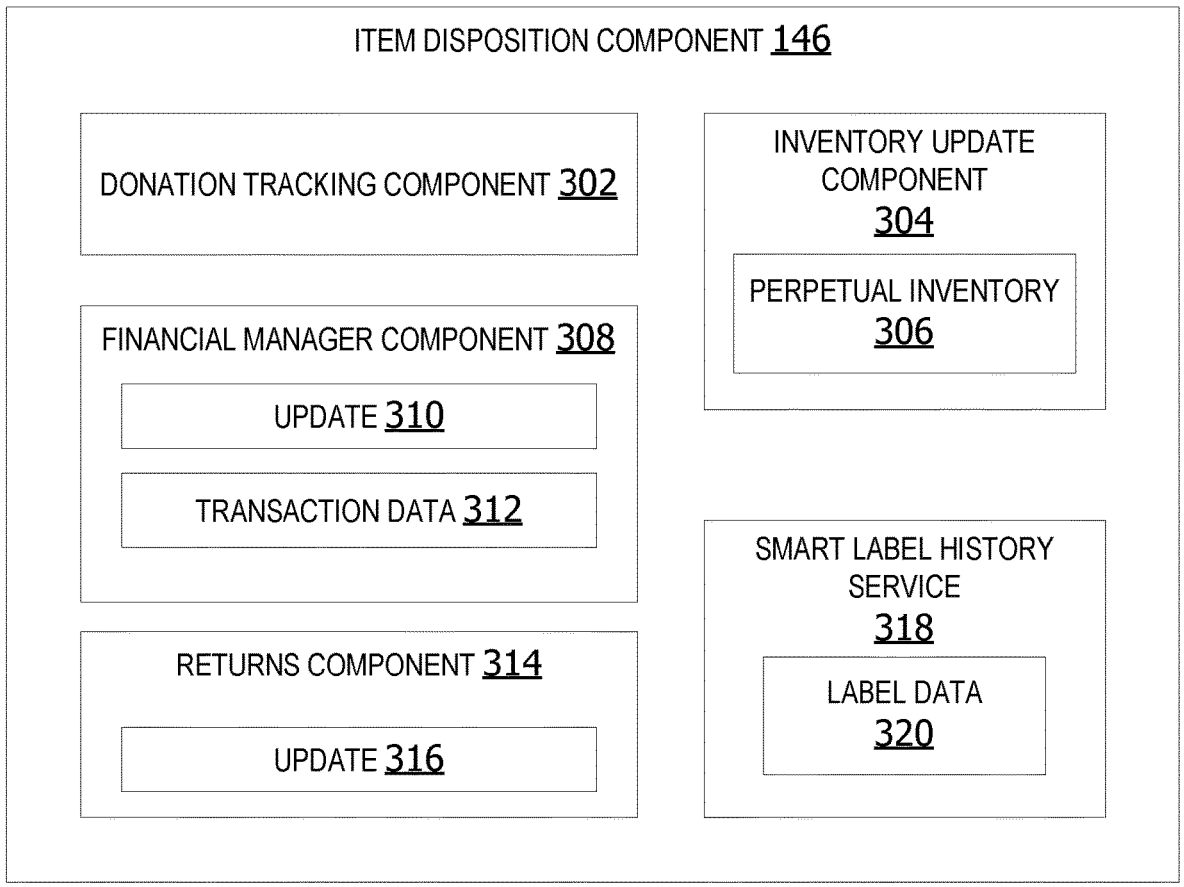
FIG. 3 is an exemplary block diagram illustrating an item disposition component for managing item dispositions.

FIG. 3 is an exemplary block diagram illustrating an item disposition component 146 for managing item dispositions. The item disposition component 146 can include a donation tracking component 302 for tracking items donated to charitable entities, such as 501(c)(3) organizations. Each time an item is donated, the donation tracking component 302 creates a record for each item donated to each charity.

The inventory update component 304 is a component for updating perpetual inventory 306. Each time an item is donated, thrown-away, recycled, or returned to a supplier, the inventory update component 304 updates the perpetual inventory records for that item to remove the item which is no longer physically present within on-hand inventory.

The financial manager component 308 is a component that provides an update 310 to transaction data 312 each time a price of an item is reduced (marked down) by the item disposition system. The returns component 314 provides an update 316 to inventory and order records each time an item is selected for return to the supplier in accordance with a vendor agreement by the item disposition system. The smart label history service 318 maintains label data, including a history/electronic record of all labels generated by the label generator. A user can remotely access the label data 320, including all the information printed on an item disposition label for a given item by accessing the label history data maintained by the smart label history service 318.

Figure 4:
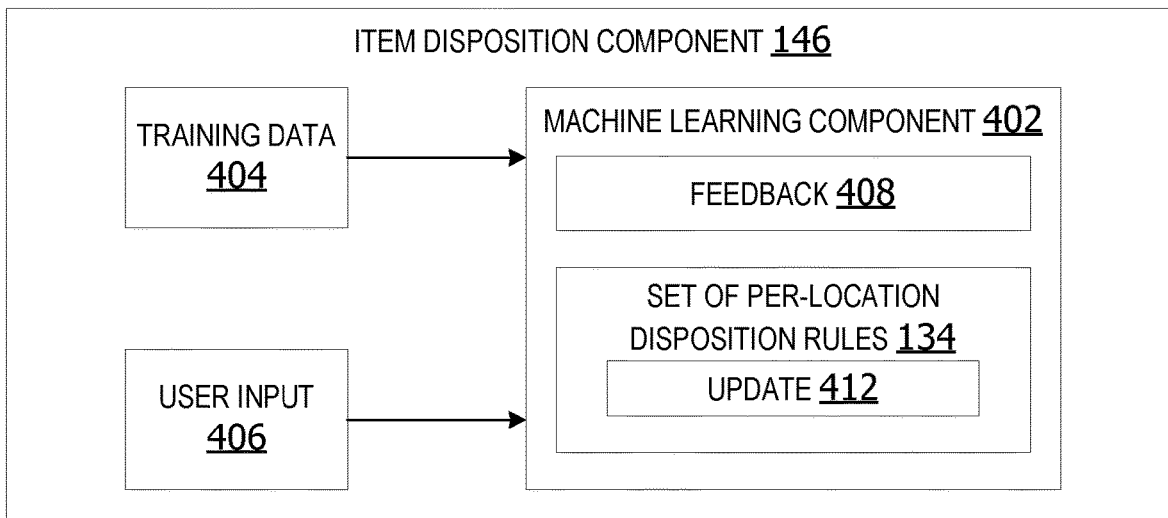
FIG. 4 is an exemplary block diagram illustrating an item disposition component including a machine learning component.

FIG. 4 is an exemplary block diagram illustrating an item disposition component 146 including a machine learning component 402. The machine learning component 402 utilizes training data 404, user input 406, and/or feedback 408 to update 412 a set of per-location disposition rules 134. The machine learning component 402 analyzes the training data, feedback and other input using artificial intelligence to learn which disposition option should be recommended for each item based on the set of per-location disposition rules 134 and the location, condition, type of item, and/or other relevant available information.

In other examples, the machine learning updates per-location item disposition rules by obtaining law/rule updates from one or more online sources. The rules updates can be performed by scraping/obtaining information via the Internet from sources such as, but not limited to, news feeds, data sources on the cloud, data storage on the cloud containing rules updates, or any other source of information associated with item disposition. The set of per-location item disposition rules can also be updated manually, in whole or in part, by a user.

Figure 5:
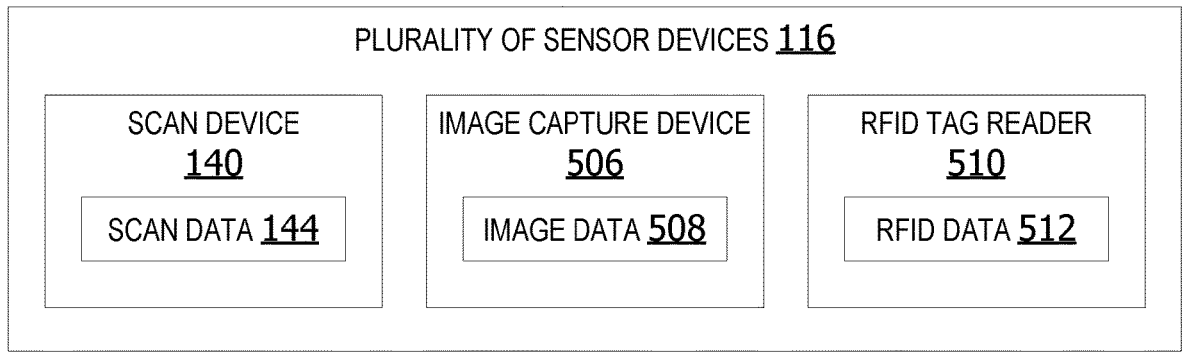
FIG. 5 is an exemplary block diagram illustrating a set of sensor devices.

FIG. 5 is an exemplary block diagram illustrating a set of sensor devices 116. The set of sensor devices 116 can include the scan device 140 for generating scan data 144 associated with a selected item, an image capture device 506 generating image data 508 associated with the selected item, and/or an RFID tag reader 510 for generating RFID tag data 512 associated with the selected item.

The scan device 140 can be implemented as a barcode scanner for reading barcode data, a quick response (QR) code reader for reading QR codes, or any other type of scanner device. A barcode scanner can be implemented as a device for reading a barcode, such as, but not limited to, a universal product code (UPC), a matrix barcode or any other type of barcode.

An image capture device can be implemented as a camera, an infrared sensor or any other type of imaging device. A camera can be a still image camera or a moving picture (video) camera. The image capture device generates images (photographs, pictures or video) of the returned item. The image data is analyzed using image analytics to identify the item and/or determine the condition of the item.

In some examples, the item disposition component 146 analyzes image data 508 including an image of at least a portion of the selected item, using image analytics to identify the condition of the item and/or the packaging, labels, and/or containers associated with the selected item. In this manner, the system analyzes the scan data 144, the image data 508, and/or the RFID tag data generated by the set of sensor devices 116 to identify a selected item and generate item condition data (identify condition of the item) without human intervention.

Figure 6:
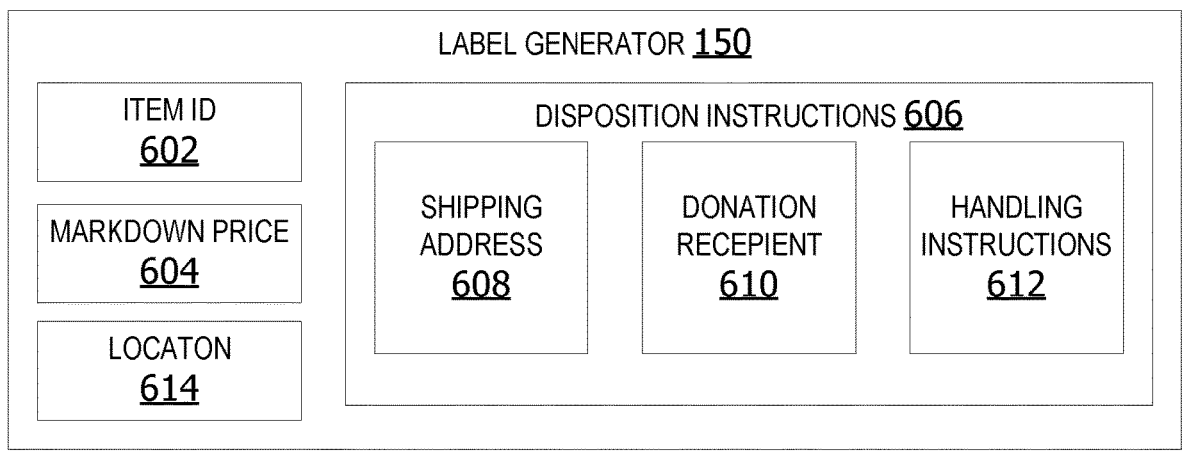
FIG. 6 is an exemplary block diagram illustrating a smart label generator.

FIG. 6 is an exemplary block diagram illustrating a label generator 150. The label generator 150 generates a label to be attached/adhered to the item by a user. The label can be a sticker label having an adhesive or glue on one side allowing the label to be stuck to the selected item or on a shipping carton/box used to ship the item. The label can include an item ID 602, a markdown price 604 for the item and/or disposition instructions 606. The disposition instructions 606 can include a shipping address for a supplier or charity to receive the item, a donation recipient 610 to pick up an item, and/or handling instructions 612 associated with proper handling of the item.

For example, if the item is a container of paint, the handling instructions can include instructions for the proper/safe disposal of paint in compliance with all applicable regulations and policies associated with disposal of paint. Likewise, if the item includes broken or cracked glass parts, the instructions can include handing instructions 612 for safe disposal or recycling of the glass. The label can also include a location 614 for placement of the item pending disposition, such as, but not limited to, a clearance cart, a recycle container, a trash compactor, etc.

The instructions 612 can include directions for where to place the item, such as in a donation bin or a locked trash receptacle designated for perishable items. The instructions 612 in other examples can include directions/instructions for wiping or replacing the memory on a connected device prior to restock, markdown, shipping, donation, or other type of item disposal. The instructions 612 can be customized on a per-item basis. In otherwise, the instructions 612 can include instructions specifically for resetting/erasing memory, removing a battery, replacing a battery, replacing a memory component, repackaging an item, repairing or replacing a part, etc.

In some examples, when the user scans the item that is to enter the disposition process, the system checks for any compliance restrictions. The system informs the user exactly what to do if there is a compliance restriction associated with the selected item.

Figure 7:
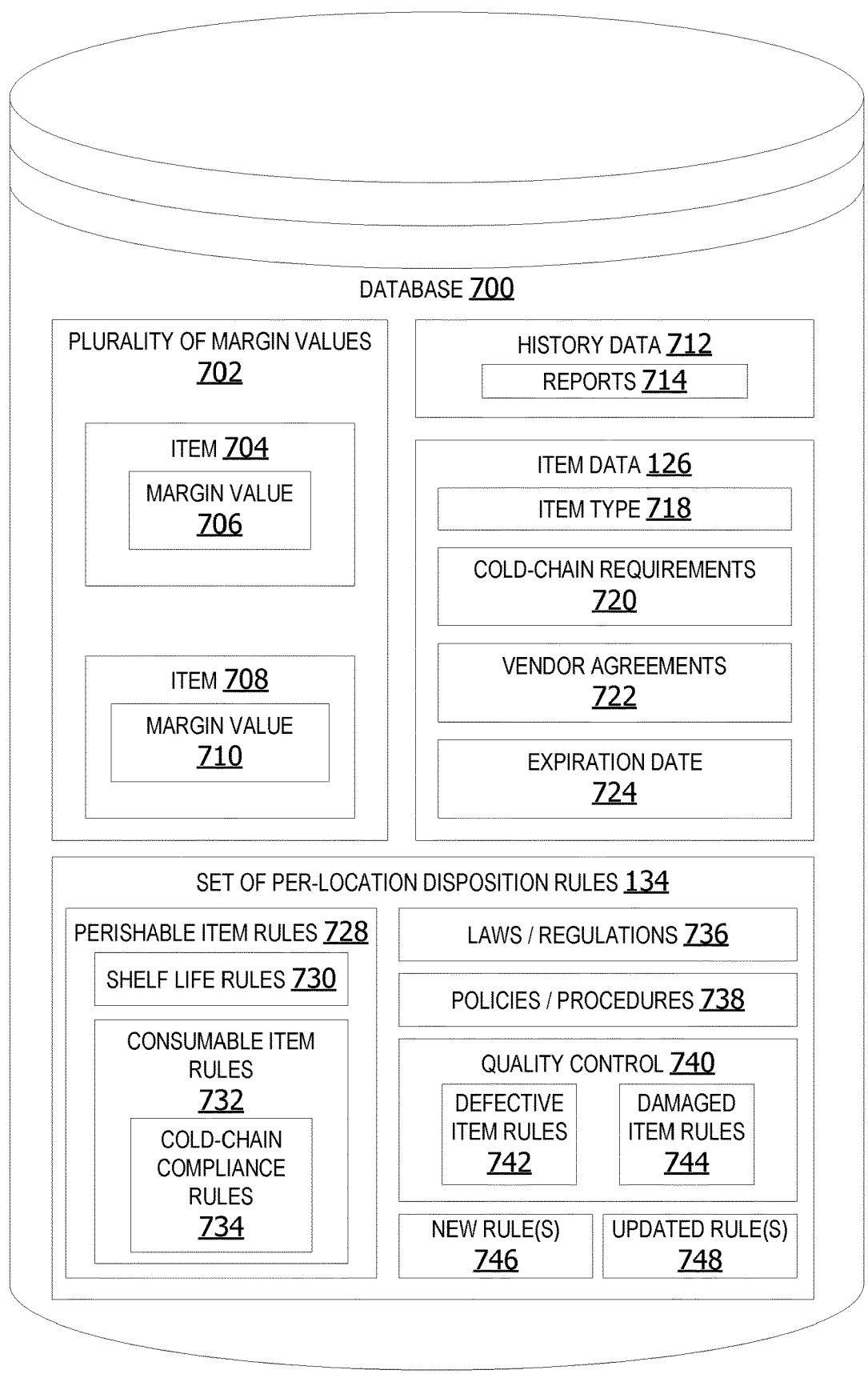
FIG. 7 is an exemplary block diagram illustrating a database.

FIG. 7 is an exemplary block diagram illustrating a database 700. The database 700 is a database for storing data. The database 700 can be located on a data store, such as, but not limited to, the data storage device 124 in FIG. 1.

In some examples, the database includes a plurality of margin values 702. The plurality of margin values 702 includes a margin value for one or more items. The margin value 706 for item 704 is the minimum price at which the item 704 can be sold without resulting in a loss. Each item can have a different margin value. For example, the item 708 has a margin value 710 (cost) which can be a different value than the margin value 706 of the item 704.

The database can include history data 712 associated with disposition of items. The history data 712 can include reports associated with the items, such as donation reports, markdown/clearance item reports, inventory reports, etc.

The item data 126 is data associated with a selected item. The item data 126 can include item type 718, cold-chain requirements 720, vendor agreements 722 and/or expiration date 724. The item type 718 can include a category of the item and/or a classification of the item. For example, the type of item 718 can include perishable or non-perishable items, comestibles, general merchandise, pet supplies, etc. Cold-chain requirements 720 can include a threshold temperature range for the item. The expiration date 724 indicates the shelf-life of the item. The expiration date 724 can include a sell-by-date, a threshold time-period prior to the expiration date during which the item is sellable at a markdown price.

The set of per-location disposition rules 134 is a set of one or more rules for identifying applicable disposition options for a selected item. The set of per-location disposition rules 134 can include, without limitation, perishable item rules 728 regarding disposition of perishable items. The perishable item rules 728 can include shelf life rules 730 associated with items having an expiration date or sell-by-date. Consumable item rules 732 includes one or more rules associated with disposition of comestibles. The consumable item rules 732 can include cold-chain compliance rules 734.

In some examples, perishable item rules 728 can include rules specifying that perishable items, expired items, and/or items out of cold-chain compliance be disposed of in a trash receptacle with a locked lid or otherwise sealed container preventing removal of the items from the trash receptible prior to disposal for reasons of health and sanitation.

The set of per-location disposition rules 134, in some examples, includes laws/regulations 736, policies/procedures 738, and/or quality control 740 rules. The quality control rules can include defective item rules 742 and/or damaged item rules 744 for removal of items from the sales floor or markdown of items that fail to meet quality standards. In another example, if the condition of an item fails to satisfy all the rules, such as state laws or regulations 736, regarding the sale, donation, consumption, recycling or other use of the item, the system identifies disposal of the item as the only applicable option.

In one example, if the item is a damaged can, the set of per-location disposition rules 134 can indicate that the item is suitable for use (markdown/donation) if the can is not dented along a seam, the sell-by-date is not expired and the ingredients on the label are still visible/intact. If the can is dented along a seam, the contents of the can are leaking, the label is gone, the ingredients are illegible, or the sell-by-date is expired, the item is only eligible for disposal or possibly return to the supplier. The item disposition component analyzes the item condition data describing the condition of the can and the label using the set of per-location disposition rules 134 to determine which options (markdown, donate, dispose, return) are applicable to the canned goods item.

In another example, if the item is packaged inside a box or other cardboard package, the set of per-location disposition rules 134 can indicate that the item is suitable for use (markdown or donation) if the outer package (box) is damaged, patched or repaired but the inner bag is sealed, there are no missing items inside a multi-pack item, the item is at least ten days from the expiration (sell-by-date) and the labels are intact and legible. The item disposition component can determine the item is unsuitable for markdown, donation or other use if the inner packaging (interior bag) is unsealed, punctured, or opened to expose the contents.

Likewise, if the item is a multi-pack item missing one or more parts, the system can determine the item is unsuitable for markdown. However, if the remaining multipacks are still in sealed bags, the items can be suitable for markdown or donation. In one example, the item disposition system provides a new claim or markdown disposition flag for identifying an item that is available for markdown.

The item disposition component identifies items for disposal (throw-away) if the items packaging is open, crushed, bulging, shows signs of tampering, or past the expiration date. If the item is a can, the item disposition rules indicate disposal is the most appropriate option if the can is dented along a seam, a dent in the can is not smooth (makes a point), a dent on the can has a sharp edge, the can is bulging, or the can is past the expiration date.

In still other examples, if the item is a food preparation item that has been used, an item that used water hydration, or any other item that has been in contact with food, the set of per-location disposition rules 134 indicates that the item is only suitable for disposal. Likewise, if the item is an iron, electric blanket, mattress, or an item containing broken glass, the rules can specify disposal of the item rather than markdown or donation.

An item can be designated for donation in other examples if the item is sealed but within ten days or less of the expiration date or the item is a multi-pack item that is missing one or more parts or sub-units such that it is no longer suitable for resale but safe for utilization.

The set of per-location disposition rules 134 can include new rule(s) 746 and/or updated rule(s) 748. When a pre-existing rule is modified, an updated rule reminder or notification is output to alert the user of the rule change applicable to the disposition of the item. If a new rule is added which is applicable to the disposition of an item, the system outputs a new rule update notification or alert to bring the new rule to the attention of the user.

The set of per-location disposition rules 134 can be updated in real-time as changes are made to the laws, regulations, policies, procedures, and other rules associated with disposition of items which have been returned or become damaged/defective. For example, if a new policy indicates any torn bags of dog food should be donated to an animal rescue rather than marked down, the system updates the set of per-location disposition rules 134 in real-time to reflect the change.

The set of connected devices rules 750 is a set of one or more policies, procedures, laws, regulation, or other rules associated with the proper handling and disposition of connected (IoT) devices. In some examples, the set of connected devices rules 750 specifies that if a connected device remains in an unopened/sealed original factory packaging, no special handling is required. The item can be re-shelved/marked down, donated or otherwise disposed of as any other item of its type and/or condition.

In other examples, if the connected device has been opened, the set of connected devices rules 750 specifies wiping/erasing memory on the device, replacing the memory on the device with a new un-used memory, sending the device to the supplier for handling, sending the device to a third-party for refurbishing or other appropriate action to ensure any user data which may have previously been entered onto the device prior to item return is erased or otherwise removed.

The set of connected devices rules 750 in other examples can specify that a connected device that has been opened by a customer or other user cannot be shelved, markdown, donated or otherwise disposed of unless or until the memory on the device has been erased (factory reset) or replaced. In other examples, the set of connected devices rules 750 can specify that a connected device be labeled with an IoT identifier prior to disposition.

Figure 8:
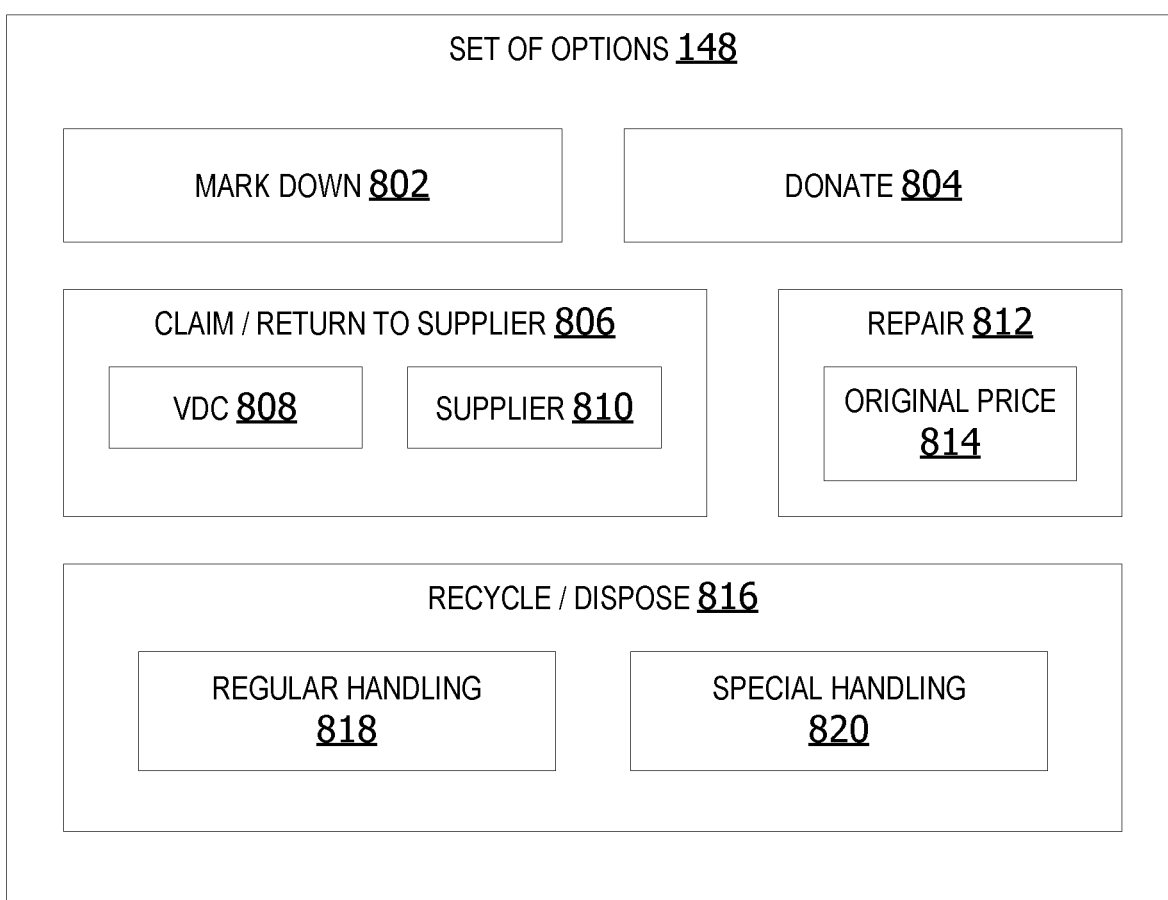
FIG. 8 is an exemplary block diagram illustrating a set of options for disposition of an item.

FIG. 8 is an exemplary block diagram illustrating a set of options 148 for disposition of an item. The set of options 148 can include markdown 802 of the original price of the item or markdown of the current price of the item if the item is already on sale or otherwise discounted. Donate 804 refers to donating the item to a charitable entity or for a charitable purpose. The set of options 148 can include claim/return to supplier 806, such as returning/shipping the item to the distribution center (DC) 808, warehouse or shipping directly back to a supplier 810.

The options can include repair 812 of the item. Repair can include repackaging the item, repairing packaging, replacing a battery, erasing memory on a connected device, replacing memory on a connected device or any other type of repair. Repair can also include refurbishment of the item 814. Refurbishment can include shipping/sending the item to a third-party or the manufacturer for refurbishment. Refurbishment can include replacing a battery or a memory component on an electronic device or other connected device.

The item can also be shipped to a return center which can handle sending the item back to the corresponding supplier of the item. In an example, a recall item or an overstock item can be shipped to a return center.

The set of options 148 can include an option to recycle/dispose 816 of the item. The recycle or dispose option can include regular handling 818 instructions for recycling or throwing away regular (non-harmful) items.

The set of options can also include special handling instructions 820. Special handling 820 instructions can be provided for items which can be dangerous or toxic, such as, but not limited to, cleaning products, medications, paints, insecticides, weed killers, broken glass, flammable liquids, etc.

In some examples, if the returned item is a connected device, the set of options includes special handling instructions for wiping or otherwise erasing the memory on the connected device prior to restocking, markdown, donation or other disposal. In still other examples, the memory on the connected device is wiped or factory reset on-site at the item return location. In other examples, the memory is replaced with a new/unused memory component. In still other examples, the set of options includes returning the connected device to a supplier or sending the IoT device to another location for wiping or replacement of the memory components on the device.

Figure 9:
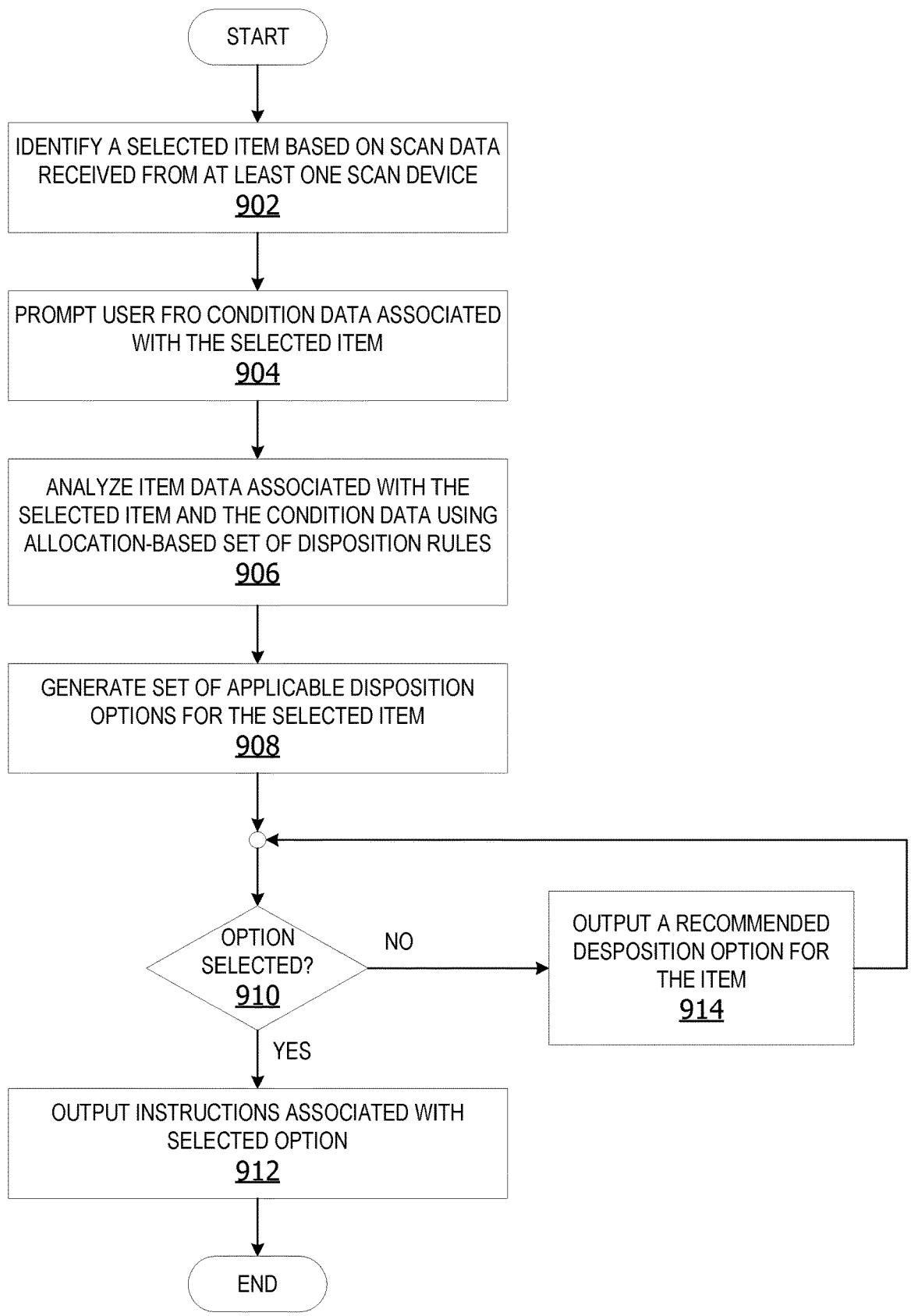
FIG. 9 is an exemplary flow chart illustrating operation of the computing device to output a recommended disposition for an item.

FIG. 9 is an exemplary flow chart illustrating operation of the computing device to output a recommended disposition for an item. The process shown in FIG. 9 can be performed by an item disposition component, executing on a computing device, such as the computing device 102 or the user device 116 in FIG. 1.

The process begins by identifying a selected item based on scan data received from at least one scan device at 902. The scan device is a device such as, but not limited to, the scan device 140 in FIG. 1 and/or FIG. 5.

The item disposition component prompts the user for condition data associated with the selected item at 904. The condition data is data describing the condition of the item, such as, but not limited to, the condition data 130 in FIG. 1. The prompt can be output to the user via a user interface, such as the user interface device 110 in FIG. 1. The prompt can also be sent to another user device via a network, such as the network 112 in FIG. 1.

In some examples, the prompts for condition data include a set of one or more questions regarding the condition of the item. For example, a prompt can include the question "Is the item packaging opened?". In some examples, a prompt instructs the user to compare the damage to image or text examples provided by system (in the user interface). The prompt can include a multiple-choice type selection of pre-generated choices for the user to select from a menu. The prompt in other examples can include a short answer form enabling the user to type a free-form written description of the item condition or verbally speak a description of the item in natural speech for analysis by a speech recognition system.

The item disposition component analyzes the item data associated with the selected item and the condition data using a location-based set of disposition rules at 906. The set of disposition rules includes one or more rules for determining appropriate item disposition options, customized to a specific item and/or a location, such as, but not limited to, the set of per-location disposition rules 134 in FIG. 1, the set of disposition rules 410 in FIG. 4 and/or the set of per-location disposition rules 134 in FIG. 7.

The item disposition component generates a set of applicable disposition options for the selected item at 908. The item disposition component determines if an option is selected at 910. If yes, the item disposition component outputs instructions associated with the selected option at 912. The process terminates thereafter.

Returning to 910, if an option in the set of applicable options is not selected, the item disposition component outputs a recommended disposition option for the item at 914. In some examples, the recommended disposition is the disposition option that maximizes value for the item. The item disposition component determines if an option is selected at 910. If yes, the item disposition component outputs instructions associated with the selected option at 912. The process terminates thereafter.

While the operations illustrated in FIG. 9 are performed by a computing device, aspects of the disclosure contemplate performance of the operations by other entities. For example, a cloud service can perform one or more of the operations.

Figure 10:
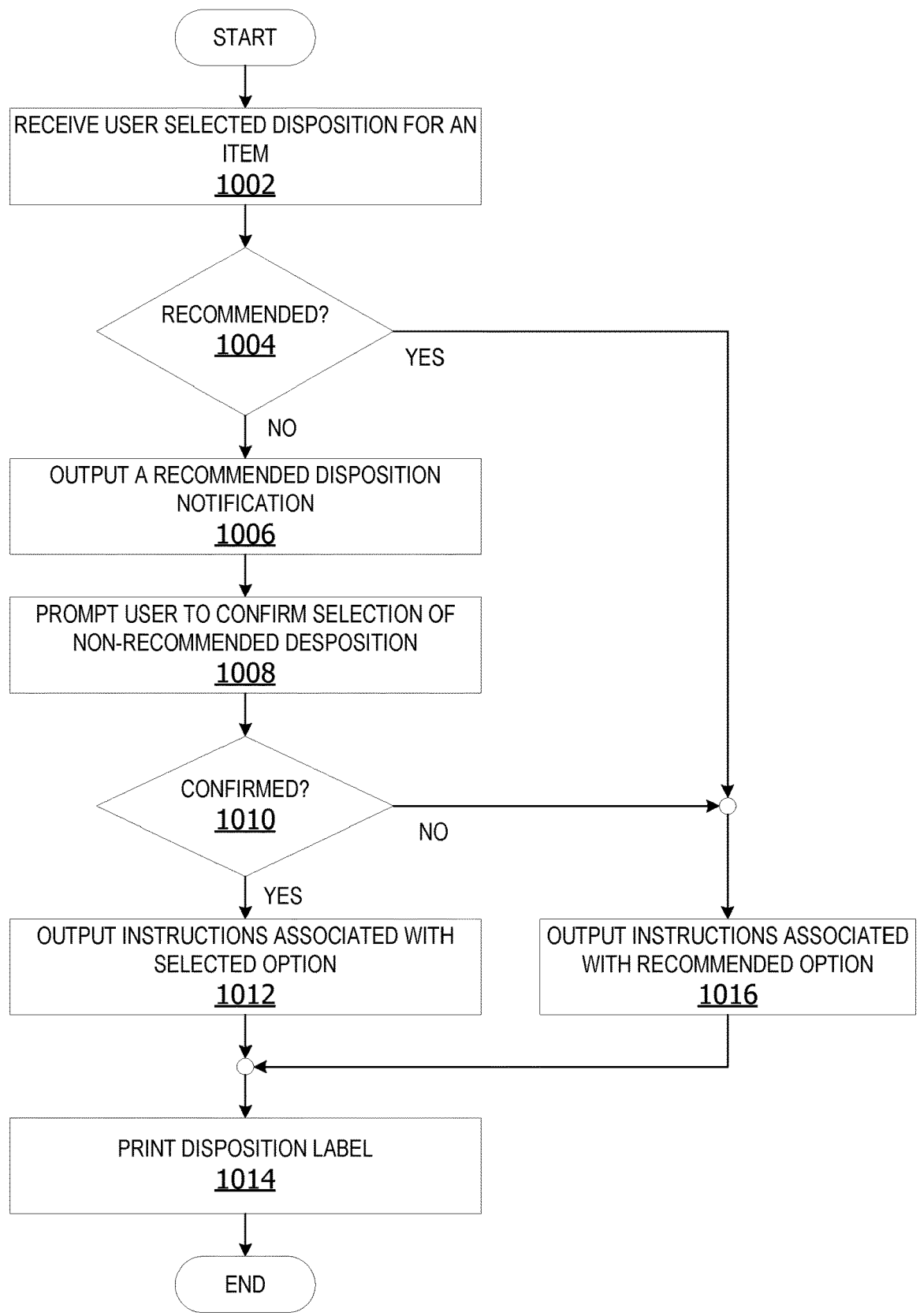
FIG. 10 is an exemplary flow chart illustrating operation of the computing device to print a disposition label.

FIG. 10 is an exemplary flow chart illustrating operation of the computing device to print a disposition label. The process shown in FIG. 9 can be performed by an item disposition component, executing on a computing device, such as the computing device 102 or the user device 116 in FIG. 1.

The process begins by receiving a user selected disposition for an item at 1002. The item disposition component determines if the selected disposition is recommended for the item at 1004. If no, the item disposition component outputs a recommended disposition notification at 1006. The item disposition component prompts the user to confirm selection of the non-recommended disposition at 1008. The item disposition component determines if the selection is confirmed at 1010. If yes, the item disposition component outputs instructions associated with the selected option at 1012. A print generator prints a disposition label at 1014. The process terminates thereafter.

Returning to 1010, if the non-recommended selection is not confirmed, the item disposition component outputs instructions associated with the recommended option at 1016. The print generator prints a disposition label at 1014. The process terminates thereafter.

Returning to 1004, if the user selected disposition is recommended, the item disposition component outputs instructions associated with the recommended option at 1016. The print generator prints a disposition label at 1014. The process terminates thereafter.

While the operations illustrated in FIG. 10 are performed by a computing device, aspects of the disclosure contemplate performance of the operations by other entities. For example, a cloud service can perform one or more of the operations.

Figure 11:
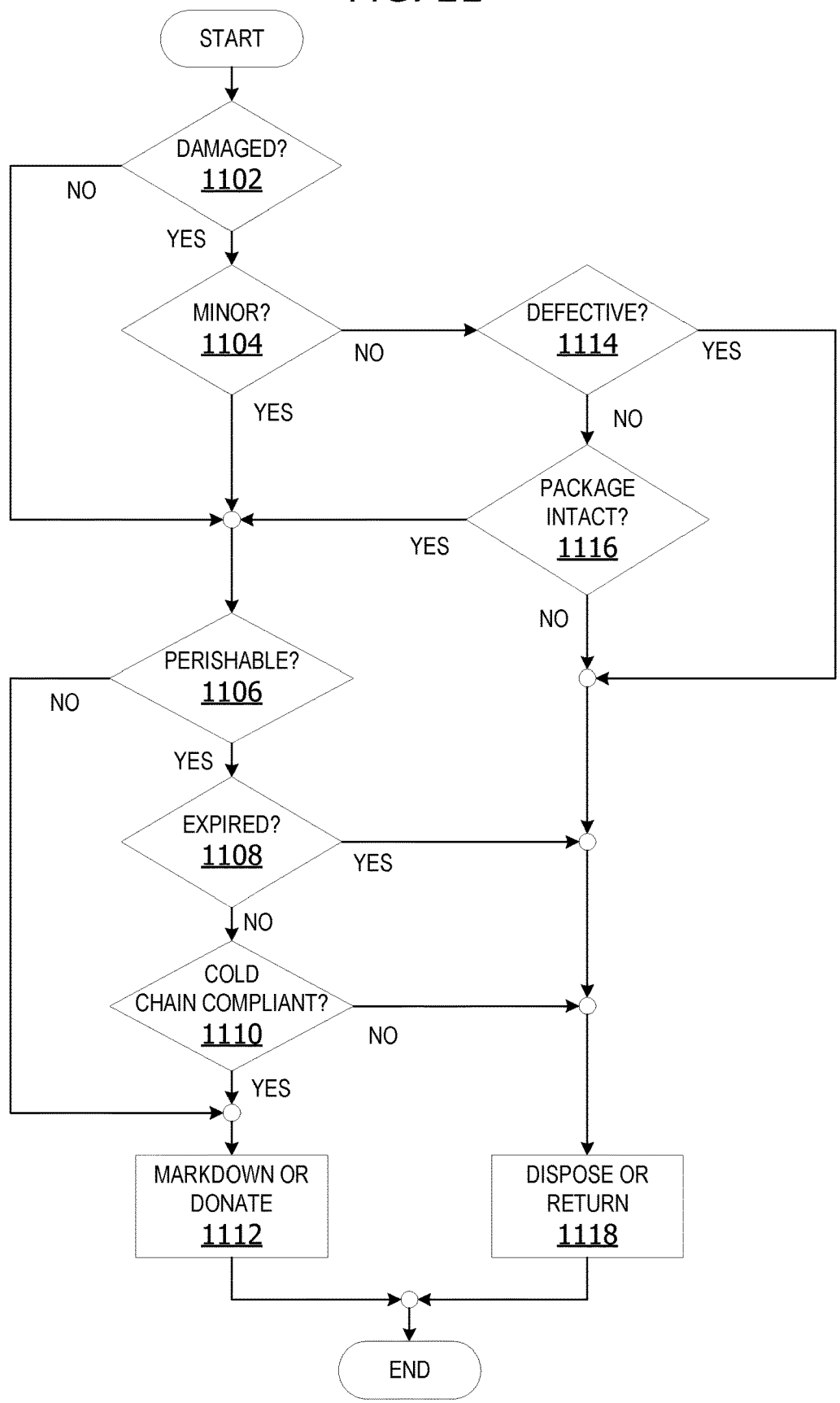
FIG. 11 is an exemplary flow chart illustrating operation of the computing device to determine applicable disposition of an item based on item condition data.

FIG. 11 is an exemplary flow chart illustrating operation of the computing device to determine applicable disposition of an item based on item condition data. The process shown in FIG. 11 can be performed by an item disposition component, executing on a computing device, such as the computing device 102 or the user device 116 in FIG. 1.

The process begins by determining if an item is damaged at 1102. If yes, the item disposition component determines if the damage is minor at 1104. Minor damage can include outer packaging that is wrinkled, bent, or dented without compromising the ingredients labels or integrity of the item packaging. If yes, the item disposition component determines if the item is perishable at 1106. If yes, the item disposition component determines if the item is expired at 1108. If no, the item disposition component determines if the item is cold-chain compliant at 1110. If yes, the set of options for disposal of the item includes an option to markdown the price of the item or an option to donate the item to the supplier at 1118. The process terminates thereafter.

Returning to 1104, if the damage is not minor, the item disposition component determines if the item is defective at 1114. If no, the item disposition component determines if the package is intact (no leaks or broken seals) at 1116. If no, the set of options for disposal of the item includes an option to dispose of the item or an option to return the item to the supplier at 1118. The set of options in some examples includes one or more options, such as, but not limited to, the set of options 148 in FIG. 1 and FIG. 8 above. The process terminates thereafter.

If the item is defective at 1114, the set of options for disposal of the item includes an option to dispose of the item or an option to return the item to the supplier at 1118. The process terminates thereafter.

Returning to 1106, if the item is not perishable, the set of options for disposal of the item includes an option to markdown the price of the item or an option to donate the item at 1118. The process terminates thereafter.

While the operations illustrated in FIG. 11 are performed by a computing device, aspects of the disclosure contemplate performance of the operations by other entities. For example, a cloud service can perform one or more of the operations.

Figure 12:
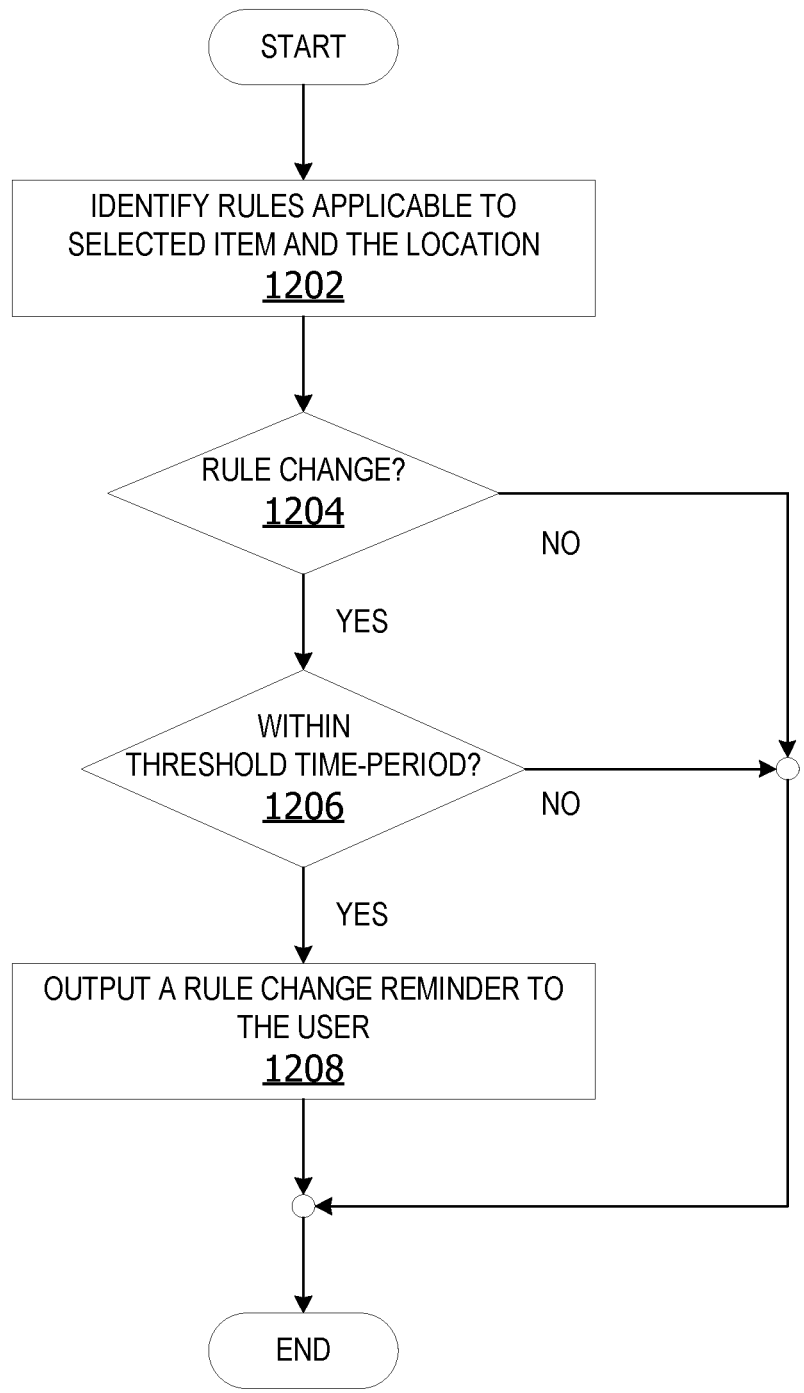
FIG. 12 is an exemplary flow chart illustrating operation of the computing device to output a rule update reminder.

FIG. 12 is an exemplary flow chart illustrating operation of the computing device to output a rule update reminder. The process shown in FIG. 12 can be performed by an item disposition component, executing on a computing device, such as the computing device 102 or the user device 116 in FIG. 1.

The process begins by identifying rules applicable to a selected item and the location of the item at 1202. The item disposition component determines if a rule change has occurred at 1204. If no, the process terminates thereafter.

If a rule change has occurred at 1204, the item disposition component determines if the rule change occurred within a threshold time-period at 1206. If no, the process terminates thereafter.

Returning to 1206, if a rule change occurred within the threshold time-period, the item disposition component outputs a rule change reminder to the user at 1208. The rule change reminder can be output via a user interface component or sent to a user device associated with a user via a network, such as the network 112 in FIG. 1. The process terminates thereafter.

While the operations illustrated in FIG. 12 are performed by a computing device, aspects of the disclosure contemplate performance of the operations by other entities. For example, a cloud service can perform one or more of the operations.

Figure 13:
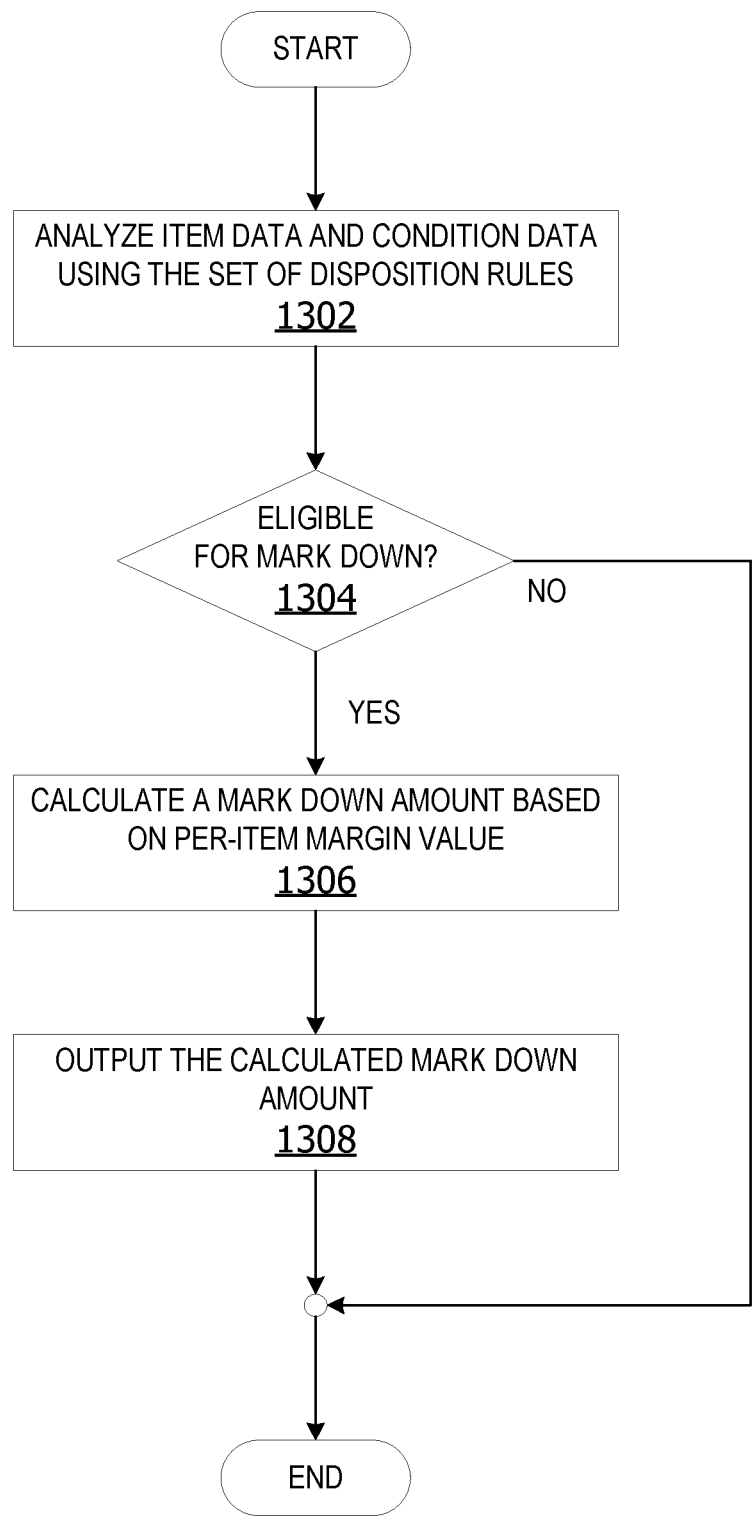
FIG. 13 is an exemplary flow chart illustrating operation of the computing device to automatically calculate a markdown amount for an item.

FIG. 13 is an exemplary flow chart illustrating operation of the computing device to automatically calculate a markdown amount for an item. The process shown in FIG. 13 can be performed by an item disposition component, executing on a computing device, such as the computing device 102 or the user device 116 in FIG. 1.

The process begins by analyzing item data and condition data using the set of disposition rules at 1302. The item data is data such as, but not limited to, the item data 126 in FIG. 1 and FIG. 7. The item disposition component determines if the item is eligible for markdown at 1304. If no, the process terminates thereafter.

If the item is eligible for markdown, the item disposition component calculates a markdown amount based on the per-item margin value at 1306. The item disposition component outputs the calculated markdown amount at 1308. The process terminates thereafter.

While the operations illustrated in FIG. 13 are performed by a computing device, aspects of the disclosure contemplate performance of the operations by other entities. For example, a cloud service can perform one or more of the operations.

FIG. 14 is an exemplary screenshot 1400 of a user device displaying margin values associated with a set of claims items. The item details 1402 in this example includes an item A 1404 having a UPC code, an original price of one dollar and eighteen cents and a cost (margin value) of seventy-seven cents. In this example, the system recommends a markdown value that is equal to or greater than the cost. In one non-limiting example, the markdown can be eighty cents to prevent negative margin for item 1404.

In this example, item B 1406 has an original price of one dollar and thirty-eight cents with a cost of ninety-six cents. In this example, the system will recommend a markdown for item 1406 that is no less than ninety-six cents to prevent negative margin. Likewise, item C 1408 has a price of three dollars and sixty-four cents with a cost of two dollars and twenty cents. The item disposition system outputs a markdown value for item 1408 that is less than the three dollars and sixty-four cents but no less than the two dollars and twenty cents. In one non-limiting example, the markdown price for item 1408 can be three dollars.

Figure 15:
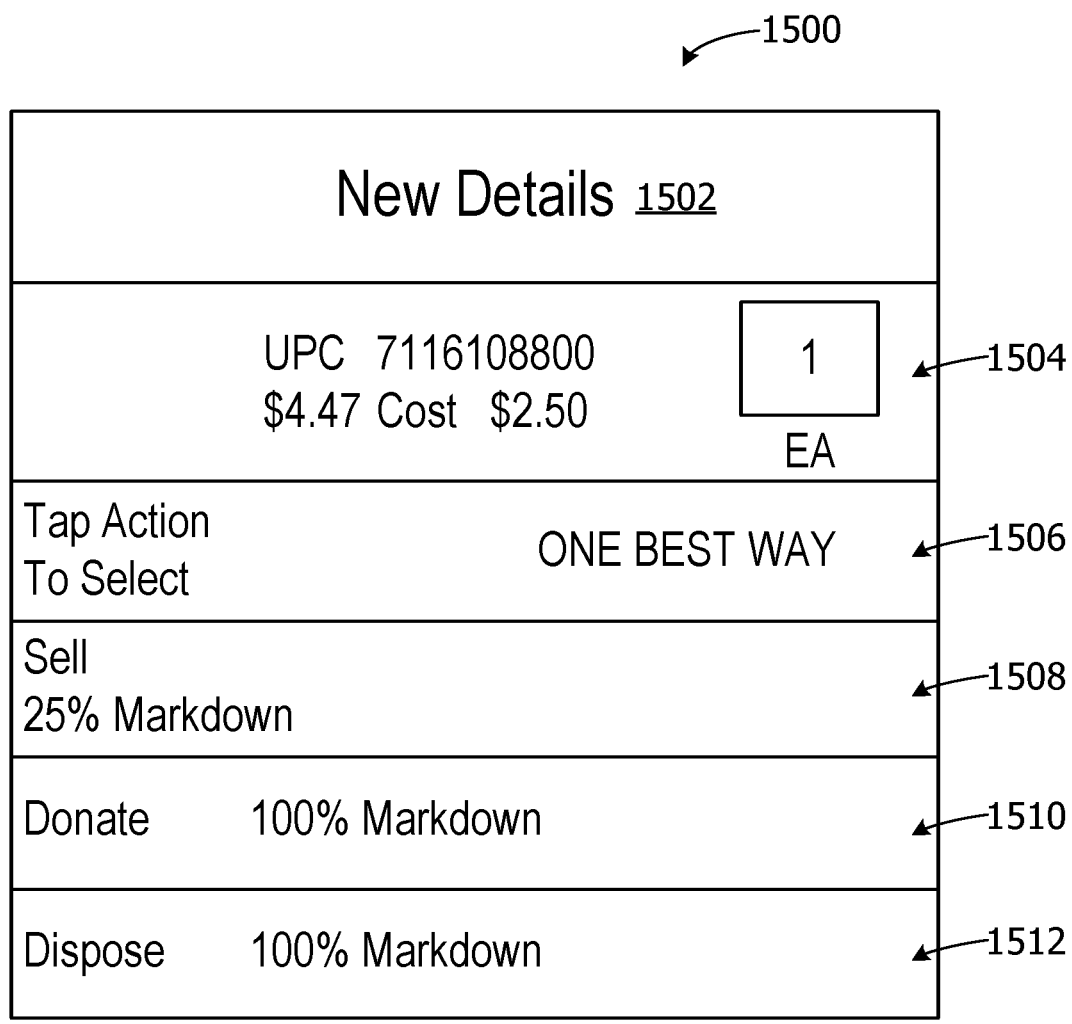
FIG. 15 is an exemplary screenshot of a user device analyzing item data to generate a set of options, including a recommended markdown price for an item.

FIG. 15 is an exemplary screenshot 1500 of a user device analyzing item data to generate a set of options, including a recommended markdown price for an item 1502. The item 1502 has an original price of four dollars and forty-seven cents with a cost of two dollars and fifty cents. The user can select a "one best way" button to obtain a recommended disposition from the set of options, which includes markdown 1508, donation 1510, and dispose 1512. If the user selects markdown, the item will be assigned a twenty-five percent discount for a final markdown price of three dollars and thirty-five cents. If the user selects donate, the donation results in a one-hundred percent markdown but helps the community. The dispose option is avoided unless the item is damaged or nonfunctional such that the item is no longer safe for utilization.

Additional Examples

In some examples, the system analyzes item data obtained when a user scans any item in a store returned by a customer and outputs a disposition recommendation, including instructions for restocking, markdown, donation, recycling and/or disposal of a returned item. The system manages the markdown decisions of claims (returned) items centrally, such that items are not marked down below cost by users (associates). If the system recommends markdown of an item, the system calculates a markdown for each item based on the per-item margin (cost) for each item and outputs a recommended markdown price, such that the margin for each item is positive or break-even (non-negative margin) without the user knowing the actual margin for each item to make this decision.

In one example, the item disposition application runs on a user device, such as a smart phone or handheld tablet computing device. The item disposition application identifies available disposition options for a selected claims item and identifies the best option based on the type of item and condition of the item. The user requires no special training to utilize the item disposition application.

The item disposition application includes a "one best way" button, which the user activates (selects) to obtain a recommended disposition option. The item disposition application replaces a paper text set of guidelines regarding claims items assessment which human users would have followed if the human user was uncertain as to the appropriate disposition of a claims item, in some examples. The user can select the button, icon or other menu option associated with the application via a user interface to obtain a recommended disposition of a selected claims item and/or obtain a recommended markdown price for the item.

In another example, the item disposition application provides a series of prompts and queries to the user regarding the condition of the item. The item disposition application provides many examples for the user to walk through to determine the best option for a scanned item. For example, the prompts and queries can assist the system in determining an extent of damage to an item and/or whether the item is suitable for sale or donation based on comparisons of the current item with images or descriptions of example items.

In an example scenario, the set of disposition rules includes rules, policies, procedures, and recommendations which would consume a five-inch binder worth of paper notes. The set of disposition rules in one example contains the tribal knowledge of multiple user's item disposition guidelines obtained through trial and error. The various manual processes/criteria for claims item disposition decisions are merged together into a single item disposition system, which utilizes machine learning, pattern recognition and rules-based analytics to maximize value in handling a returned item via a single scan of the returned item with minimal user interaction.

The item disposition application in some examples is hosted securely on a computing device or system at a central location that takes confidential input on the margin for products, via their product file, and prompts the associate processing claims at a local store as to the best step/options for handling the returned claim items. Additionally, the item disposition rules can be changed centrally and maintained dynamically. The near real-time nature of certain item (commodity) pricing provides that the disposition rules for an item by be similarly dynamic, changing a given fixed state's best course of action, such as trash to markdown, for example.

If a user selects a donate option, in some examples, the system tells the user where to put the item. For example, the system can output an identification/location of an open carton designated for donation. If the user selects a dispose option, the system checks for recall and vendor agreement as to overstock/recall scenarios. The system prioritizes options and auto-progress down best option, asks item condition questions, then tells the user where to leave the item.

For example, the set of instructions can include an instruction to leave the item in a can, bin, box or other container designated for disposal. The disposal location can be specific for hazardous items. The system can also indicate whether the system will file a claim for the item, and can print a special label that goes on a bucket liner for item (in the case of a hazmat issue)

The system in other examples eliminates the use of paper handwritten claim chits and automates/integrates all disposition processes into a single application. A chit is a piece of paper that is manually filled out by an associate that describes why the product is being sent to claims. The chit is usually fasted to the item with tape.

The item disposition application accounts for item returns, in-store defective items, expired/out of date items, cancelled or abandoned on-line orders, overstock items, recall items, and culling perishable items. The application also provides seamless visibility to item information, assessments and dispositions along the returns path that eliminates redundancy processes, reduces touches (human involvement), and provides visibility to user training opportunities. The application can also implement a smart label where appropriate to track previous decisions and disposition information and/or output dispose directions to support rule compliance.

The system provides chargeback visibility reporting, markdown reporting by department (CVP PI) and/or exception reporting for excessive overrides of recommended options. The application runs on a mobile user device, allowing the user to complete their work anywhere in the store. The user is unable to view cost/margin data they are not authorized to see due to system security. This security can be permission-based, such that users do not see modules or disposition types they are not authorized to use. The system, in some examples, automatically provides the correct level of security when processing an item. The system blocks a user that does not have the proper security level to file a claim, dispose of the item, etc.

The item disposition application in some examples determines if a user needs finer guidance/more assistance with item disposition decisions. The system provides guidance to the user. As the user becomes more experienced with the item disposition assessments, the system provides less guidance. If the user knows exactly what they want to do with the item, the system provides them the ability to jump directly to the specific disposition method.

In some example, the system identifies an item and obtains the characteristics of the item. The system checks a supplier database and/or one or more online sources to determine whether there are any item recalls associated with the item. If yes, the item is handled in accordance with the recall instructions. If no, the system determines if the item can be returned to the supplier by checking the terms of the per-item and per-supplier contract/agreement. If the supplier agreement(s) permit return of the item, the item is packaged for shipping back to the supplier. If not, the system determines if the item is suitable for restocking or sale at the original price or a markdown price. If yes, the item is restocked in a display assigned to the item/type of items/ similar items or marked down and stocked in a clearance/ markdown area or display (clearance rack, shelf, buggy, box or other display). If the item is not suitable for restocking/ sale, the system determines if the item is suitable for donation to a charitable organization or other charitable entity. If yes, the item is packaged with other items being donated. A label can be attached to the item or box the item is being placed into which provides instructions for donating the item and/or identification the charity to whom the item is being donated.

In other examples, if the item is not suitable for donation, the system identifies appropriate instructions for recycling or disposing of the item. For example, if the item is a perishable item which is no longer fit for human consumption or a hazardous item requiring special handling, the system generates or outputs instructions for the safe handling, packaging, recycling and/or disposal of the item. In one example, if the item is a battery or electronic device, the instructions provide safe handling and recycling instructions for the item.

The system in still other examples autonomously identifies returned items which are connected devices. The system determines whether the memory on the connected device can be wiped or factory reset and outputs instructions to do so to the user. This enables quick and accurate identification of IoT devices and ensures previously entered data is not available to the next user.

In other examples, the system instructs the user to connect the returned IoT device to reset the device (erase previously entered data), assess condition of the device and/or identify other attributes associated with the returned item.

Alternatively, or in addition to the other examples described herein, examples include any combination of the following:

an assessment component, implemented on the at least one processor, that analyzes item data associated with a selected item in a set of returned items and condition data describing a condition of the selected item using a set of per-location disposition rules to identify a set of applicable disposition options associated with the selected item;

a notification component, implemented on the at least one processor, that outputs a rule update reminder to a user associated with performing disposition of the selected item on condition at least one rule in the set of per-location disposition rules is a new rule added to the set of per-location disposition rules within a predetermined time-period prior to disposition determination or the at least one rule is a rule modified within the predetermined time-period;

a recommendation component, implemented on the at least one processor, that generates a recommended disposition of the selected item based on the set of applicable disposition options and a result of the analysis;

an instruction generator, implemented on the at least one processor, that generates a set of instructions for performing the recommended disposition of the selected item, the set of instructions including at least one of a location for placement of the selected item and the calculated per-item markdown amount;

a user interface component, implemented on the at least one processor, that outputs the recommended disposition and the set of instructions to the user in real-time as the user is performing the disposition of the selected item;

a calculator component, implemented on the at least one processor, that calculates a per-item markdown amount for the selected item on condition the recommended disposition includes markdown of the selected item, wherein the set of instructions includes the per-item markdown amount;

a label generator generating a disposition label, for placement on the selected item, the disposition label comprising an identification of the selected disposition;

a printer device configured to print the disposition label;

a prompt output to a user device associated with a user by the notification component, wherein the prompt requests a user to provide condition data describing a condition of the selected item;

the notification component outputs a confirmation request to a second user device associated with a second user, wherein the confirmation request confirms confirmation of a non-recommended option from the set of applicable disposition options for the selected item;

an item disposition component, implemented on the at least one processor, prompts the user to confirm selection of a disposition option from the set of applicable disposition options if the selected option is a non-recommended option;

a machine learning component utilizes training data, user input and feedback to update at least one rule in the set of per-location disposition rules;

an inventory update component, implemented on the at least one processor, updates perpetual inventory on a data storage device on condition the selected item is no longer physically present within on-hand inventory due to donation, disposal, recycling or return to supplier;

a donation tracking component, implemented on the at least one processor, creates a record for each returned item donated to a charity;

a financial manager component, implemented on the at least one processor, updates transaction data associated with the selected item each time a price of an item is reduced;

a returns component, implemented on the at least one processor, provides an update to inventory and order records each time an item is selected for return to the supplier;

identifying, by an assessment component, a selected item based on analysis of scan data obtained from at least one scan device;

prompting, by a notification component, a user to provide condition data describing a condition of the selected item;

generating, by an assessment component, a set of applicable disposition options associated with the selected item based on an analysis of item data associated with the selected item and the condition data using a set of per-location disposition rules;

outputting, by a recommendation component, a recommended disposition of the selected item from the set of applicable disposition options based on the analysis of the condition data, item data and the set of per-location disposition rules;

receiving, by a user interface component, a user-selection of a disposition from the set of applicable disposition options via a user interface component;

outputting, by an instruction generator, a set of instructions to a first user for performing the recommended disposition of the selected item on condition the selected disposition is the recommended disposition, the set of instructions including at least one of a location for placement of the selected item and the calculated per-item markdown amount;

printing, by a smart label generator, a disposition label, for placement on the selected item, the disposition label comprising an identification of the selected disposition;

outputting, by the notification component, a prompt requesting confirmation of the selected disposition to a second user on condition the selected disposition is a non-recommended disposition;

printing, by a printer device, a disposition label associated with the selected disposition on condition confirmation is received from the second user;

outputting a rule update reminder to the user on condition a rule in the set of per-location disposition rules is added, removed or modified with a predetermined time-period prior to the item disposition assessment;

calculating, by a calculator component, a per-item markdown amount for the selected item on condition the recommended disposition or selected disposition includes markdown of the selected item;

calculating, by the calculator component, a percentage markdown amount for the selected item based on the condition data and margin value for the item;

calculating, by the calculator component, a price decrement value for the selected item based on the condition data and margin value for the item, wherein the original price assigned to the selected item is reduced by the decrement value;

instructing the user to wipe a memory or replace a memory device associated with the selected item on condition the selected item is identified as a connected device returned in at least partially opened packaging; and calculating, by the calculator component, a final discount price of the selected item based on the condition data and margin value for the item.

At least a portion of the functionality of the various elements in FIG. 1, FIG. 2, FIG. 3, FIG. 4, FIG. 5, FIG. 6, FIG. 7, FIG. 8 and FIG. 9 can be performed by other elements in FIG. 2, FIG. 3, FIG. 4, FIG. 5, FIG. 6, FIG. 7, FIG. 8 and FIG. 9 or an entity (e.g., processor 106, web service, server, application program, computing device, etc.) not shown in FIG. 2, FIG. 3, FIG. 4, FIG. 5, FIG. 6, FIG. 7, FIG. 8 and FIG. 9.

In some examples, the operations illustrated in FIG. 9, FIG. 10, FIG. 11, FIG. 12, and FIG. 13 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing disposition of claims items. For example, the elements illustrated in FIG. 1, FIG. 2, FIG. 3, FIG. 4, FIG. 5, FIG. 6, FIG. 7, and FIG. 8, such as when encoded to perform the operations illustrated in FIG. 9, FIG. 10, FIG. 11, FIG. 12, and FIG. 13 constitute exemplary means for identifying a selected item based on analysis of scan data obtained from at least one scan device; constitute exemplary means for prompting a user to provide condition data describing a condition of the selected item; constitute exemplary means for generating a set of applicable disposition options associated with the selected item based on an analysis of item data associated with the selected item and the condition data using a set of per-location disposition rules; constitute exemplary means for receiving a selection of a disposition in the set of applicable disposition options; constitute exemplary means for outputting a prompt requesting confirmation of the selected disposition on condition the selected disposition is a non-recommended disposition; constitute exemplary means for outputting a set of instructions for performing the recommended disposition of the selected item; and constitute exemplary means for printing a disposition label, for placement on the selected item.

Other non-limiting examples provide one or more computer storage devices having a first computer-executable instructions stored thereon for providing customized returned item disposition management. When executed by a computer, the computer performs operations including analyzing sensor data generated by a set of sensor devices associated with a returned item to identify the returned item and retrieve item data associated with the returned item; prompting a first user to provide condition data associated with the returned item via a user interface device; generating a set of applicable disposition options for the returned item based on the condition data, the item data, and a set of per-location disposition rules to generate a set of applicable disposition options; receiving a selection of a disposition from the set of applicable disposition options; calculating a markdown amount for the returned item on condition the selected disposition is markdown of the returned item; requesting confirmation from at least one user on condition the selected disposition is a non-recommended disposition; outputting a set of instructions for performing the selected disposition to a first user on condition the selected disposition is a recommended disposition or confirmation is received from the at least one user; and printing a label identifying a selected disposition from the set of applicable dispositions for attachment to the returned item.

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customized disposition of returned items, the system comprising:
   a memory;
   at least one processor communicatively coupled to the memory;
   an assessment component, implemented on the at least one processor, that analyzes item data associated with a selected item in a set of returned items and condition data describing a condition of the selected item using a set of per-location disposition rules to identify a set of applicable disposition options associated with the selected item, wherein the condition data is received from a sensor and includes a condition of the selected item and a condition of packaging of the selected item;
   a notification component, implemented on the at least one processor, that outputs a rule update reminder to a user associated with performing disposition of the selected item on condition at least one rule in the set of per-location disposition rules is a new rule added to the set of per-location disposition rules within a predetermined time-period prior to disposition determination or the at least one rule is a rule modified within the predetermined time-period;
   a recommendation component, implemented on the at least one processor, that generates a recommended disposition of the selected item based on the set of applicable disposition options and a result of the analysis, wherein the recommended disposition of the selected item provides a highest disposition value path for the selected item;
   an instruction generator, implemented on the at least one processor, that generates a set of instructions for performing the recommended disposition of the selected item including at least one of a location for placement of the selected item corresponding to the highest disposition value path for the selected item; and
   a user interface component, implemented on the at least one processor, that outputs the recommended disposition and the set of instructions to the user in real-time as the user is performing the disposition of the selected item corresponding to the highest disposition value path for the selected item.

2. The system of claim 1, further comprising:
   a calculator component, implemented on the at least one processor, that calculates a per-item markdown amount for the selected item on condition the recommended disposition includes markdown of the selected item, wherein the set of instructions includes the per-item markdown amount.

3. The system of claim 1, further comprising:
   a label generator generating a disposition label, for placement on the selected item, the disposition label comprising an identification of a selected disposition; and
   a printer device configured to print the disposition label.

4. The system of claim 1, further comprising:
   a prompt output to a user device associated with the user by the notification component, wherein the prompt requests the user to provide the condition data describing a condition of the selected item, wherein:
   the user interface component is configured to receive a prompt input from the user device selecting a disposition option different than the recommended disposition,
   the user interface component is configured to receive a confirmation from the user device confirming the selection of the disposition option different than the recommended disposition, and
   the user interface component is configured to output a second set of instructions corresponding to the disposition option different than the recommend disposition.

5. The system of claim 1, wherein the user is a first user and further comprising:
   the notification component outputs a confirmation request to a second user device associated with a second user, wherein the confirmation request confirms confirmation of a non-recommended option from the set of applicable disposition options for the selected item.

6. The system of claim 1, further comprising:
   an item disposition component, implemented on the at least one processor, prompts the user to confirm selection of a disposition option from the set of applicable disposition options if the selected disposition option is a non-recommended option.

7. The system of claim 1, further comprising a machine learning component configured to:
   utilize training data, user input and feedback to update the at least one rule in the set of per-location disposition rules, and
   analyze the training data, user input and feedback using artificial intelligence (AI) to learn disposition rules for the selected item.

8. The system of claim 1, further comprising:
   an inventory update component, implemented on the at least one processor, updates perpetual inventory on a data storage device on condition the selected item is no longer physically present within on-hand inventory due to donation, disposal, recycling or return to a supplier.

9. The system of claim 1, further comprising:
   a donation tracking component, implemented on the at least one processor, creates a record for each returned item donated to a charity.

10. The system of claim 1, further comprising:
    a financial manager component, implemented on the at least one processor, updates transaction data associated with the selected item each time a price of an item is reduced.

11. The system of claim 1, further comprising:
    a returns component, implemented on the at least one processor, provides an update to inventory and order records each time an item is selected for return to a supplier.

12. A computer-implemented method for managing customized disposition of a returned item, the computer-implemented method comprising:

identifying, by an assessment component, a selected item based on analysis of scan data obtained from at least one scan device;

receiving, from a sensor, condition data describing a condition of the selected item and a condition of packaging of the selected item;

generating, by an assessment component, a set of applicable disposition options associated with the selected item based on an analysis of item data associated with the selected item and the condition data using a set of per-location disposition rules; and outputting, by a recommendation component, a recommended disposition of the selected item from the set of applicable disposition options based on the analysis of the condition data, item data and the set of per-location disposition rules, wherein the recommended disposition of the selected item provides a highest disposition value path for the selected item.

13. The computer-implemented method of claim 12, further comprising:

receiving, by a user interface component, a user-selection of a disposition from the set of applicable disposition options;

outputting, by an instruction generator, a set of instructions to a first user for performing the recommended disposition of the selected item on condition a selected disposition is the recommended disposition, the set of instructions including at least one of a location for placement of the selected item; and printing, by a smart label generator, a disposition label, for placement on the selected item, the disposition label comprising an identification of the selected disposition.

14. The computer-implemented method of claim 13, further comprising:

outputting, by a notification component, a prompt requesting confirmation of a selected disposition to a second user on condition the selected disposition is a non-recommended disposition; and printing, by a printer device, the disposition label associated with the selected disposition on condition confirmation is received from the second user.

15. The computer-implemented method of claim 12, further comprising:

outputting a rule update reminder to a user on condition a rule in the set of per-location disposition rules is added, removed or modified with a predetermined time-period prior to the item disposition assessment.

16. The computer-implemented method of claim 12, further comprising:

calculating, by a calculator component, a per-item markdown amount for the selected item on condition the recommended disposition or selected disposition includes markdown of the selected item.

17. The computer-implemented method of claim 16, further comprising:

calculating, by the calculator component, a percentage markdown amount for the selected item based on the condition data and margin value for the item.

18. The computer-implemented method of claim 16, further comprising:

calculating, by the calculator component, a price decrement value for the selected item or a final markdown prices for the selected item based on the condition data and margin value for the item, wherein an original price assigned to the selected item is reduced by the decrement value.

19. The computer-implemented method of claim 16, further comprising:

instructing a user to wipe a memory or replace a memory device associated with the selected item on condition the selected item is identified as a connected device returned in at least partially opened packaging.

20. One or more computer storage media, having computer-executable instructions for customized disposition of a returned item that, when executed by a computer cause the computer to perform operations comprising:

analyzing sensor data generated by a set of sensor devices associated with a returned item to identify the returned item and retrieve item data associated with the returned item;

receiving condition data associated with the returned item from a sensor, the condition data including a condition of the returned item and a condition of packaging of the returned item;

generating a set of applicable disposition options for the returned item based on the condition data, the item data, and a set of per-location disposition rules;

receiving a selection of a disposition from the set of applicable disposition options;

calculating a markdown amount for the returned item on condition a selected disposition is markdown of the returned item;

requesting confirmation from at least one user on condition the selected disposition is a non-recommended disposition;

outputting a set of instructions for performing the selected disposition to a first user on condition the selected disposition is a recommended disposition or confirmation is received from the at least one user, wherein the recommended disposition of the selected item provides a highest disposition value path for the selected item; and printing a label identifying a selected disposition from the set of applicable dispositions for attachment to the returned item.

* * * * *